United States Patent
Hayes et al.

(10) Patent No.: US 11,335,918 B2
(45) Date of Patent: May 17, 2022

(54) CORRUGATED FUEL ELECTRODE

(71) Applicant: Form Energy, Inc., Somerville, MA (US)

(72) Inventors: Joel Ryan Hayes, Chandler, AZ (US); Ramkumar Krishnan, Scottsdale, AZ (US); Todd Trimble, Phoenix, AZ (US); Clifford Anderson, Tempe, AZ (US)

(73) Assignee: FORM ENERGY, INC., Somerville, MA (US)

( * ) Notice: Subject to any disclaimer, the term of this patent is extended or adjusted under 35 U.S.C. 154(b) by 248 days.

(21) Appl. No.: 16/343,158

(22) PCT Filed: Oct. 20, 2017

(86) PCT No.: PCT/US2017/057552
§ 371 (c)(1),
(2) Date: Apr. 18, 2019

(87) PCT Pub. No.: WO2018/075870
PCT Pub. Date: Apr. 26, 2018

(65) Prior Publication Data
US 2019/0319278 A1   Oct. 17, 2019

Related U.S. Application Data

(60) Provisional application No. 62/410,852, filed on Oct. 21, 2016.

(51) Int. Cl.
*H01M 8/0254* (2016.01)
*H01M 4/66* (2006.01)
(Continued)

(52) U.S. Cl.
CPC ........ *H01M 8/0254* (2013.01); *H01M 4/661* (2013.01); *H01M 4/742* (2013.01);
(Continued)

(58) Field of Classification Search
CPC ............ H01M 8/0524; H01M 8/0232; H01M 8/0245; H01M 8/18; H01M 8/184;
(Continued)

(56) References Cited

U.S. PATENT DOCUMENTS

| 956,252 A | * | 4/1910 | Wilson | .................... G09F 5/04 |
|---|---|---|---|---|
| | | | | 40/530 |
| 3,615,845 A | * | 10/1971 | Gray | ................... H01M 8/2484 |
| | | | | 429/513 |

(Continued)

FOREIGN PATENT DOCUMENTS

| CN | 105789552 A | 7/2016 |
|---|---|---|
| EP | 0229473 A1 | 7/1987 |

(Continued)

OTHER PUBLICATIONS

International Search Report and Written Opinion of the International Searching Authority dated Jan. 18, 2018 issued in corresponding International Patent Application No. PCT/US2017/057552.

(Continued)

*Primary Examiner* — Karie O'Neill Apicella
(74) *Attorney, Agent, or Firm* — The Marbury Law Group PLLC

(57) ABSTRACT

A fuel electrode incorporates a first and second corrugated portion that are attached to each other at offset angles respect to their corrugation axis and therefore reinforce each other. A first corrugated portion may extend orthogonally with respect to a second corrugated portion. The first and second corrugated portions may be formed from metal wire and may therefore have a very high volumetric void fraction and a high surface area to volume ratio (sa/vol). In addition, the strands of the wire may be selected to enable high conductivity to the current collectors while maximizing the sa/vol. In addition, the shape of the corrugation, including the period distance, amplitude and geometry may be selected (Continued)

with respect to the stiffness requirements and electrochemical cell application factors. The first and second corrugated portions may be calendared or crushed to reduce thickness of the fuel electrode.

33 Claims, 17 Drawing Sheets

(51) Int. Cl.
 H01M 4/74 (2006.01)
 H01M 4/78 (2006.01)
 H01M 8/0232 (2016.01)
 H01M 8/0245 (2016.01)
 H01M 8/18 (2006.01)
 H01M 12/08 (2006.01)

(52) U.S. Cl.
 CPC ............. *H01M 4/747* (2013.01); *H01M 4/78* (2013.01); *H01M 8/0232* (2013.01); *H01M 8/0245* (2013.01); *H01M 8/184* (2013.01); *H01M 12/08* (2013.01)

(58) Field of Classification Search
 CPC .......... H01M 4/66; H01M 4/661; H01M 4/74; H01M 4/747; H01M 4/78; H01M 12/08
 See application file for complete search history.

(56) References Cited

U.S. PATENT DOCUMENTS

| | | | |
|---|---|---|---|
| 4,746,415 A * | 5/1988 | Boulton | C25B 9/65 204/253 |
| 5,227,256 A | 7/1993 | Marianowski et al. | |
| 5,565,072 A | 10/1996 | Faita et al. | |
| 5,750,289 A | 5/1998 | Kejha | |
| 5,780,186 A | 7/1998 | Casey, Jr. | |
| 6,379,833 B1 | 4/2002 | Hill et al. | |
| 6,835,027 B1 * | 12/2004 | Glass | A01G 13/0293 256/DIG. 3 |
| 7,399,391 B2 * | 7/2008 | Oldani | H01M 8/0245 204/252 |
| 8,372,255 B2 | 2/2013 | Perego et al. | |
| 2010/0040926 A1 * | 2/2010 | Blanchet | H01M 4/8605 429/434 |
| 2012/0000789 A1 * | 1/2012 | Turek | C25B 9/19 205/516 |
| 2014/0087147 A1 | 3/2014 | Shelby et al. | |
| 2015/0214591 A1 | 7/2015 | Yoshida et al. | |
| 2016/0111729 A1 | 4/2016 | Kim et al. | |
| 2017/0222246 A1 | 8/2017 | Kreiner et al. | |
| 2017/0244106 A1 * | 8/2017 | Mortensen | H01M 4/42 |

FOREIGN PATENT DOCUMENTS

| | | |
|---|---|---|
| EP | 0813261 A2 | 12/1997 |
| KR | 2016-0108938 A | 9/2016 |

OTHER PUBLICATIONS

International Preliminary Report on Patentability dated Jun. 20, 2019 issued in corresponding International Patent Application No. PCT/US2017/057552.

Office Action dated Dec. 23, 2021 issued in corresponding Chinese Patent Application No. 201780079332.5, with English translation (18 pgs.).

* cited by examiner

PRIOR ART

CORRUGATED FUEL ELECTRODE

CROSS-REFERENCE TO RELATED APPLICATIONS

This application is a national stage entry of PCT/US2017/057552, filed Oct. 20, 2017, which claims priority to U.S. Provisional Patent No. 62/410,852, filed on Oct. 21, 2016. The subject matter of each of these applications is incorporated by reference herein in its entirety.

BACKGROUND

Field

The invention relates to fuel electrodes for electrochemical power systems and particularly to fuel electrodes for metal-air rechargeable power systems.

Description of Related Art

Fuel electrodes for battery and power systems require contact with an ionic conductive medium, such as an electrolyte and electrical coupling with a current collector to allow current flow to and from the fuel electrode. It is desirable in many systems to have a large surface area of contact between the fuel electrode and the electrolyte to enable loading of fuel onto the electrode while minimizing thickness of the deposited fuel. A fuel electrode with a very high surface-area-to-volume ratio (also called the surface to volume ratio and variously denoted sa/vol or SA:V, the amount of surface area per unit volume that a material occupies) is desirable. It is also desirable for this surface area to be readily accessible to the electrolyte and not small internal pores within the fuel electrode material, as this may present limitations to depositing of the fuel. In addition, it is desirable that the surface of the fuel electrode be smooth with limited corners as this may be an area of charge concentration and can lead to dendrite formation. Fuel electrodes are usually made of metal and therefore a high specific surface area, surface area per unit mass, i.e. $m^2/g$, is desired to keep the cost of the fuel electrode down.

Porous metal fuel electrodes provide a high sa/vol but are cost prohibitive in many applications and have irregularly shaped pores. The pores within a porous metal span a wide range of sizes and present a tortuous path from the exterior of the porous metal to the most interior pores within the porous metal. This tortuous path to the internal surface area, and smaller pores, can present flow restrictions of the electrolyte and result in poor exchange and reaction rates. In addition, some of the pores within a porous metal fuel electrode can become blocked or clogged with deposits thereby reducing the effective sa/vol ratio over time as these clogged pores become unavailable for reaction. Electrolyte has to flow from the outside surface of the porous metal through a labyrinth of pores to reach pores and surface area within the depth of the porous metal. Therefore, the structure of a porous metal, while having a high initial sa/vol ratio, may present mass transport limitations, can have a reduced sa/vol ratio over time due to blocked pores, can have low electrolyte exchange or permeability of electrolyte therethrough, and can be cost prohibitive.

In addition, if the fuel electrode bows or flexes it can contact the opposite electrode and short out the system. Fuel electrodes made out of sheets of material are susceptible to such deflection and bowing. To prevent this, spacers or separators are often placed between the fuel electrode and the opposing electrode, or cathode, to prevent shorting. The fuel electrode is sometimes in direct contact with a spacer which reduces surface area available for reaction. Spacers add cost and can reduce the flow and mixing of electrolyte within the cell.

Furthermore, in some electrochemical systems, deposits, such as dendrites can form on the fuel electrode which can extend out from the surface. If these dendrites contact the opposing electrode they can short the system. The dendrites can also become dislodged from the surface of the fuel electrode and fall to the bottom of the cell where they can also build up and extend over to the opposing electrode to cause a short.

Metal foams or 3D foams have been used, in some cases, to form part of the electrode structure. However, such foams are not ideal for a variety of reasons, including, for example, producing irregularities, providing reduced open area, producing rough surfaces with sharp or undesirable angles and corners, and having lower surface area to volume ratios.

SUMMARY

One aspect of the present invention provides a fuel electrode for an electrochemical cell. The electrode comprises a first corrugated portion formed of an electroconductive material. The first corrugated portion has a first corrugation axis and comprises a plurality of apertures therethrough. A second corrugated portion is formed of an electroconductive material. The second corrugated portion has a second corrugation axis offset from the first corrugation axis and comprises a plurality of apertures therethrough. Electrode attachments attach the first and second corrugated portions to each other.

Another aspect of the invention provides an electrochemical cell comprising the foregoing fuel electrode with metal fuel electrodeposited thereon, a cathode, such as an air electrode, and an ionically conductive medium between the fuel electrode and the cathode.

Other aspects, features, and advantages will become apparent from the following detailed description, the accompanying drawings and the appended claims.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 2:
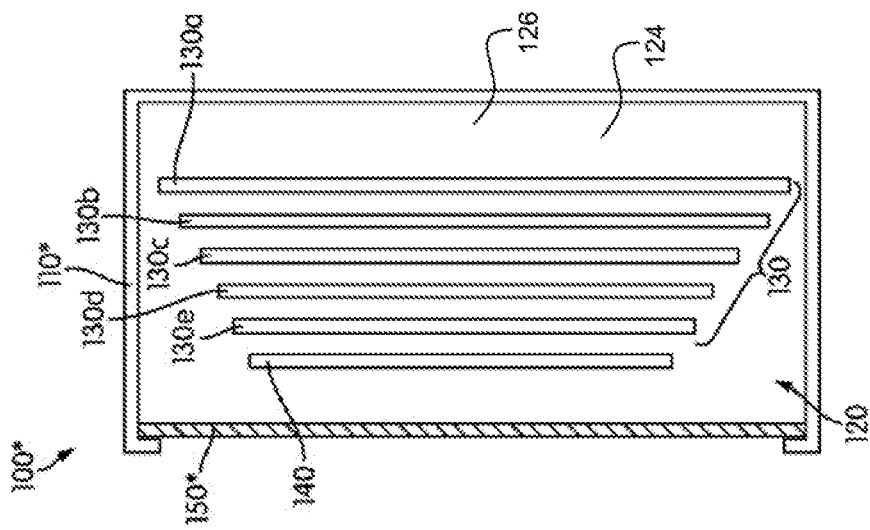
FIG. 2 depicts a schematic view of an electrochemical cell having an oxidant reduction electrode which defines a boundary wall for the electrochemical cell.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale and some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

In cases where the present specification and a document incorporated by reference include conflicting and/or inconsistent disclosure, the present specification shall control.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications and improvements are within the scope of the present invention.

Various portions of the electrochemical cell 100 may be of any suitable structure or composition, including but not limited to being formed from plastic, metal, resin, or combinations thereof. Accordingly, the cell 100 may be assembled in any manner, including being formed from a plurality of elements, being integrally molded, or so on. In various embodiments the cell 100 and/or the housing 110 may include elements or arrangements from one or more of U.S. Pat. Nos. 8,168,337, 8,309,259, 8,491,763, 8,492,052, 8,659,268, 8,877,391, 8,895,197, 8,906,563, 8,911,910, 9,269,996, 9,269,998 and U.S. Patent Application Publication Nos. 20100316935, 20110070506, 20110250512, 20120015264, 20120068667, 20120202127, 20120321969, 20130095393, 20130115523, and 20130115525, each of which are incorporated herein in their entireties by reference.

Figure 1:
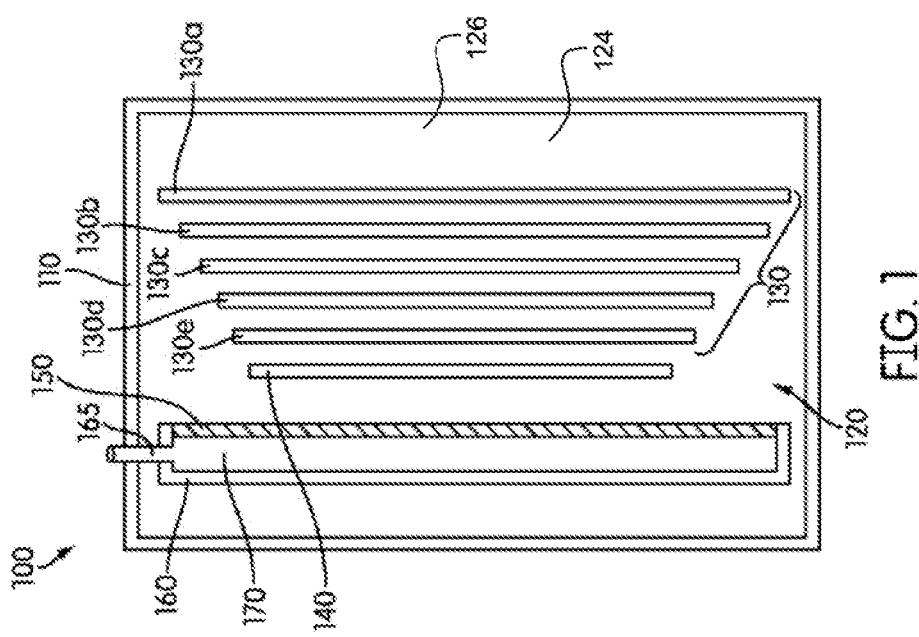
FIG. 1 depicts a schematic view of an electrochemical cell having an immersed oxidant reduction electrode.

FIG. 1 illustrates a schematic cross sectional view of an electrochemical cell 100. As shown, the components of the electrochemical cell 100 may be contained at least partially in an associated housing 110. The cell 100 utilizes a liquid ionically conductive medium 124, such as an electrolyte 126, that is contained within the housing 110, and is configured to circulate therein to conduct ions within the cell 100. While at times the ionically conductive medium may be generally stationary within the housing 110, such as in a stagnant zone, it may be appreciated that the cell 100 may be configured to create a convective flow of the ionically conductive medium. In some embodiments, the flow of the ionically conductive medium may be a convective flow generated by bubbles of evolved gas in the cell 100, such as is described in U.S. Patent Publication No. 2013/0115532 incorporated above in its entirety by reference Although in the illustrated embodiment of FIG. 1 the cell housing is configured such that the oxidant reduction electrode 150 is immersed with the oxidant reduction electrode module 160 into the cell chamber 120, it may be appreciated that in various embodiments, other configurations or arrangements of the cell 100 are also possible. For example, in FIG. 2, another embodiment of the cell 100 (specifically, cell 100*) is presented, whereby an oxidant reduction electrode 150* defines a boundary wall for the cell chamber 120, and is sealed to a portion of a housing 110* so as to prevent seepage of ionically conductive medium therebetween. In some such embodiments the convective flow of the ionically conductive medium in the cell chamber 120, described in greater detail below, may be in a direction upwards and away from the oxidant reduction electrode 150*, across the top of the fuel electrode 130.

Figure 3:
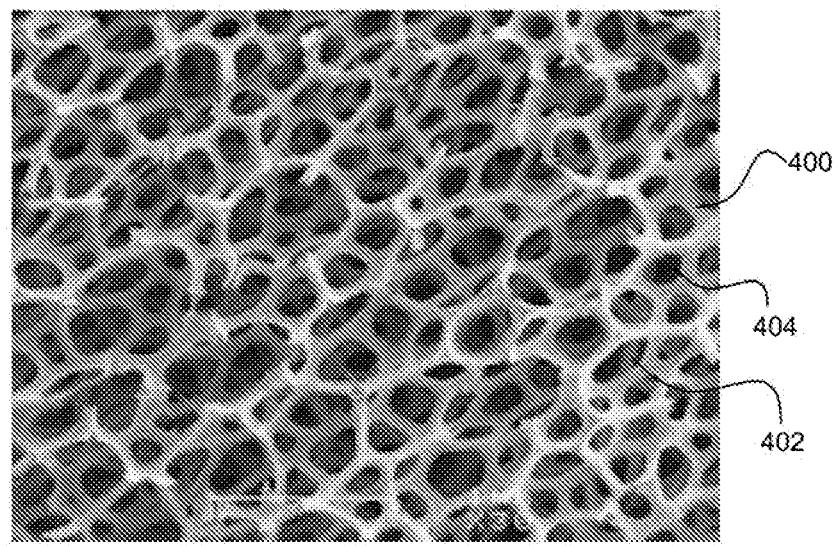
FIG. 3 shows a surface image of metal foam.

As shown in FIG. 3, a prior art metal foam 400 has metal fused together to form an interconnected network having pores 404. The pores are variable in size. The structure has internal porosity or internal surface area 402. Internal surface area is the surface area that extends into the outer surface or is beneath an outer surface. In addition, metal foam and sintered metal have irregularly shaped pores and surfaces, many with rough or very low radius elements. The structure has a large number of sharp edges or protrusions that can lead to the formation of dendrites.

Figure 4:
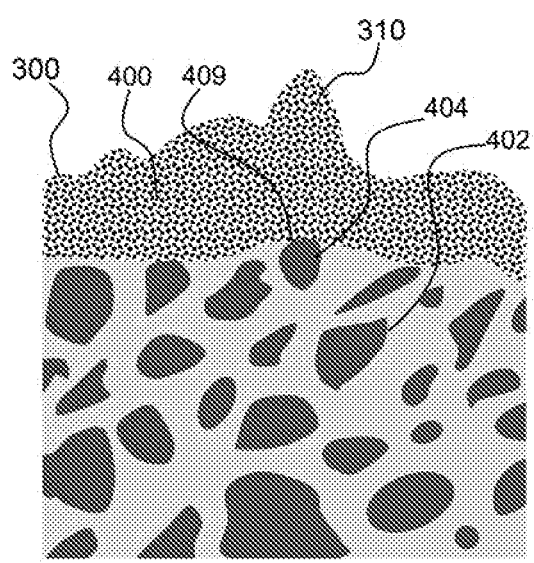
FIG. 4 shows a cross sectional diagram of fuel deposition on a surface of metal foam.

FIG. 4 shows a dendrite 310 formed in the fuel deposition 300 layer on the metal foam 400, as generally known in the art. The dendrite has formed over the low radius of curvature element 409, or protrusion from the metal foam surface. As described herein, protrusion from the surface and or sharp corners may be areas of charge concentrations that can lead to dendrite formation. Also shown in FIG. 4 the internal surface area 402 that may have limited or no fuel deposition. The fuel deposition layer 300 on the surface of the metal foam may block the internal surface area and prevent fuel deposition on the internal surfaces of the metal foam.

As noted previously, using these type metal foams or 3D foams as part of the electrode structure is not optimal or ideal because they result in irregularities, a reduced open area, rough surfaces with undesirable angles and/or corners, and a lower surface area to volume ratio.

Figure 5:
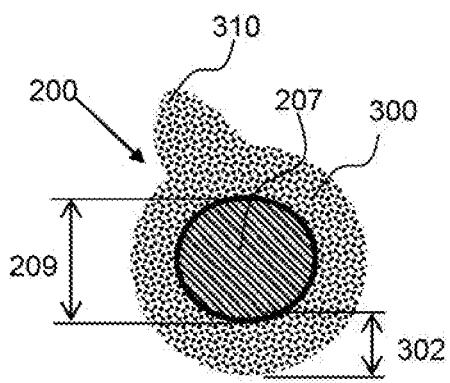
FIG. 5 shows a cross-section of fuel deposition on a metal wire.

As shown in FIG. 5, a fuel electrode comprises a fuel element, or metal wire 207, having diameter 209 and a fuel deposition layer 300 of thickness 302 around the wire. In addition, a dendrite 310 has formed in the fuel deposition layer.

Figure 6:
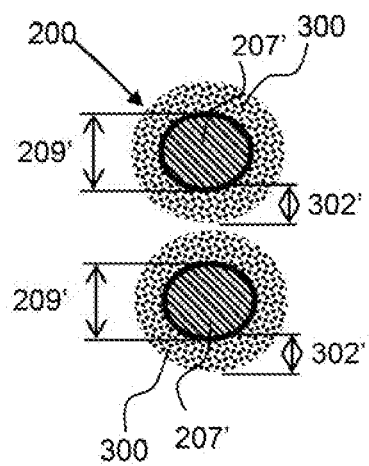
FIG. 6 shows a cross-section of fuel deposition of two smaller metal wires than shown in FIG. 5.

As shown in FIG. 6, a fuel electrode comprises wires 207' having a smaller diameter 209' than the wire shown in FIG. 5. Again, there is a fuel deposition layer 300 around the wires having a thickness 302'. The thickness of the fuel deposition layer on each wire 207' in FIG. 6 is less than the fuel deposition layer thickness in FIG. 5, but there is more surface area for deposition in the fuel electrode of FIG. 6 because more wires of smaller diameter can be arranged in the same overall volume. Therefore, the fuel is spread out over this larger surface area in a thinner layer.

Figure 7:
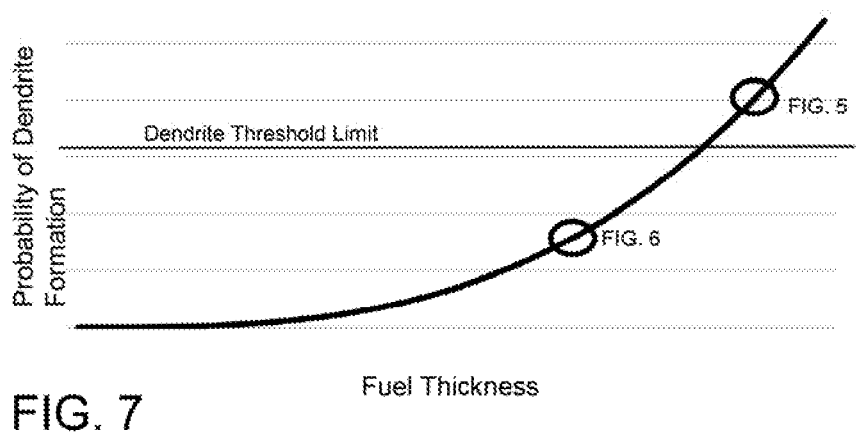
FIG. 7 shows a graph of the probability of dendrite formation versus thickness of fuel deposition.

FIG. 7 shows a graph of the probability of dendrite formation versus thickness of fuel deposition. As the thickness of fuel deposition increases, the probability of dendrite formation increases. Therefore, for a given amount of deposition, the fuel electrode shown in FIG. 5 may be above a threshold probability of dendrite formation whereas the fuel electrode shown in FIG. 6 remains below the dendrite threshold limit.

Figure 8:
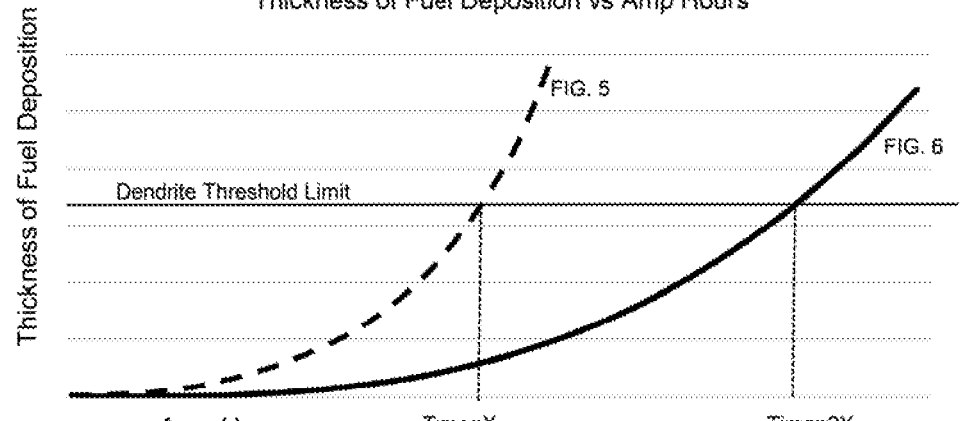
FIG. 8 shows a graph of the thickness of fuel deposition versus amp hours and two lines for different fuel electrodes.

FIG. 8 shows a graph of the thickness of fuel deposition versus amp hours and two lines for different fuel electrodes. For a given number of amp-hours, a fuel will be deposited over the available surface area of the fuel electrode and the fuel electrode in FIG. 6, having a higher surface area, will have a slower growth in the thickness of the fuel deposition layer. Therefore, the fuel electrode shown in FIG. 6 can run for a longer time before exceeding the dendrite threshold limit and therefore has a higher run capacity. However, the fuel electrode in FIG. 6 comprises wires that are smaller in diameter, and therefore may be more flexible or fragile, which is not desirable. The corrugated electrode, as described herein, can provide sufficient stiffness with smaller diameter wire screens or other configurations.

A fuel electrode for an electrochemical cell comprises two or more corrugated portions configured with their corrugation axes offset from one another and attached to each other (also referred to as a "corrugated structure" throughout this disclosure) to produce a stiffer corrugated laminate fuel electrode preferably with high sa/vol. Rotating the corrugation direction of one corrugated portion relative to another enhances the structural rigidity of the fuel electrode. In addition, the open area of the corrugated fuel electrode can be optimally tailored as desired and may be uniform and provide little resistance to flow therethrough. For example, the first corrugated portion may be configured vertically within the cell, wherein the first corrugation axis extends from the top to the bottom of the cell and the second corrugated portion may be configured orthogonally to the first corrugated portion, wherein the second corrugation axis extends horizontally, or across the cell. The axes need not align with the vertical/horizontal directions of the cell, and reference to these directions in the illustrated embodiment is for convenience. The first and second corrugated portions may be attached to each other by attachments whereby the two attached corrugated portions support and reinforce each other to create a fuel electrode that is stiffer in the vertical and horizontal directions, or along the first corrugation axis and orthogonal to the first corrugation axis, as well as in torsion. The second corrugated portion may be configured at a second corrugation axis offset angle, i.e., its axis is offset at an angle relative to the first corrugation axis. In an embodiment, the second corrugation axis offset angle is preferably at least about 30 degrees or more, about 45 degrees or more, about 60 degrees, 90 degrees or more or in any range between and including the offset angles provided. In an embodiment, the offset of the second corrugation axis from the first corrugation axis is between about 25 degrees to about 90 degrees. In one embodiment, the second corrugation axis is about 45 degrees offset from the first corrugation axis. In another embodiment, the second corrugation axis is about 90 degrees offset from the first corrugation axis. In an embodiment, the first corrugated portion and/or the second corrugated portion may be calendared or crushed to reduce thickness of the corrugated structure and/or the fuel electrode. A fuel electrode may comprise any suitable number of corrugated portions including, but not limited to, two or more, three or more, four or more, five or more, ten or more and any in range between and including the numbers provided.

A corrugated metal portion may comprise, consist essentially of, or consist of an electrically conductive material including, metal, nickel, zinc, copper, aluminum, steel, platinum, gold, silver, palladium, plated metal, nickel plated steel, nickel plated stainless steel and the like. A metal may be selected for a particular electrochemical application taking into account the type of electrolyte, the conductivity requirements as well as cost requirements.

Figure 9:
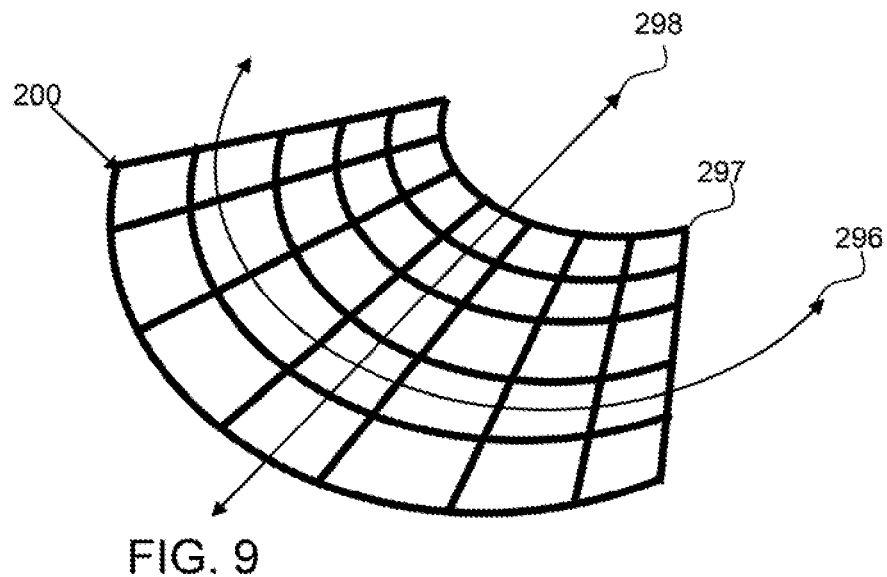
FIG. 9 shows a metal screen that is flexible.

FIG. 9 shows a fuel electrode 200 made of a metal screen 297 that is flexible. The metal screen is being rolled in the first axis 296 but could also be rolled or easily flexed or bent in the perpendicular second axis 298. As used herein, the axis or axes in general refer to the major or X-Y axes of the plane corresponding to the shape of the electrode, and not the Z-direction of the thickness. A corrugation axis more specifically means the axis parallel to the direction in which the corrugations extend.

Figure 10:
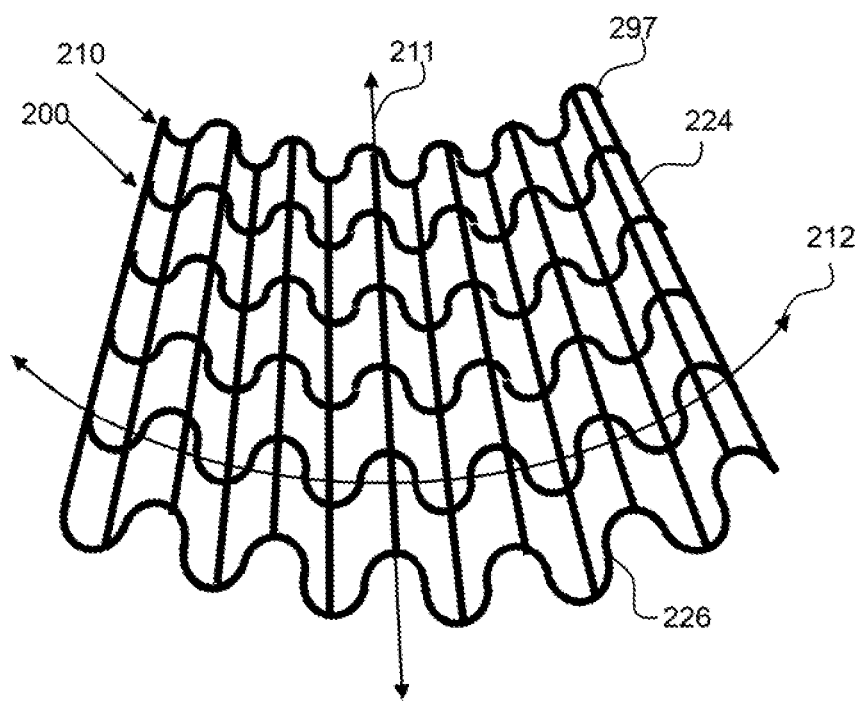
FIG. 10 show a corrugated metal screen that is flexible along one axis and stiffened by the corrugation in the opposing axis.

As shown in FIG. 10, a metal screen 297 is corrugated to form a first corrugated portion 210 of a fuel electrode. The corrugations extend in the corrugation axis 211, wherein the peaks and troughs of the corrugations are aligned with this corrugation axis. The corrugated portion is flexible and can be easily rolled or flexed in the cross-corrugation axis 212 as shown by the curved double arrow line indicating the cross-corrugation axis. However, the first corrugated portion will be stiffened and more resistant to flexing and bending in the corrugation axis, as the corrugations increase the stiffness of the metal screen in that axis.

A woven screen or fabric couples the corrugation axis extensions and cross-corrugation extensions together through the weave itself. A mesh may comprise corrugation axis extensions and cross-corrugation extensions that are attached to each other by fasteners, adhesive, welding or soldering. The welded attachments may be discrete, such as spot welds. A weld attachment comprises fused materials, such as a first and second corrugated portion being fused together. A metal wire from a first corrugated portion may be welded to a metal wire of the second corrugated portion to form a weld attachment. Heat and pressure may be applied to cause the compressed portions to fuse into each other. Diffusion welding may also be used. Diffusion welding is a solid state welding process by which two metals, which may be dissimilar, can be bonded together. Diffusion involves the migration of atoms across the joint, due to concentration gradients. Diffusion welding may be preferred as it does not require as much heating as conventional welding and therefore may produce a more robust attachment. Resistance welding or ultrasonic bonding may also be employed to bond a first corrugated portion to a second corrugated portion.

Figure 11:
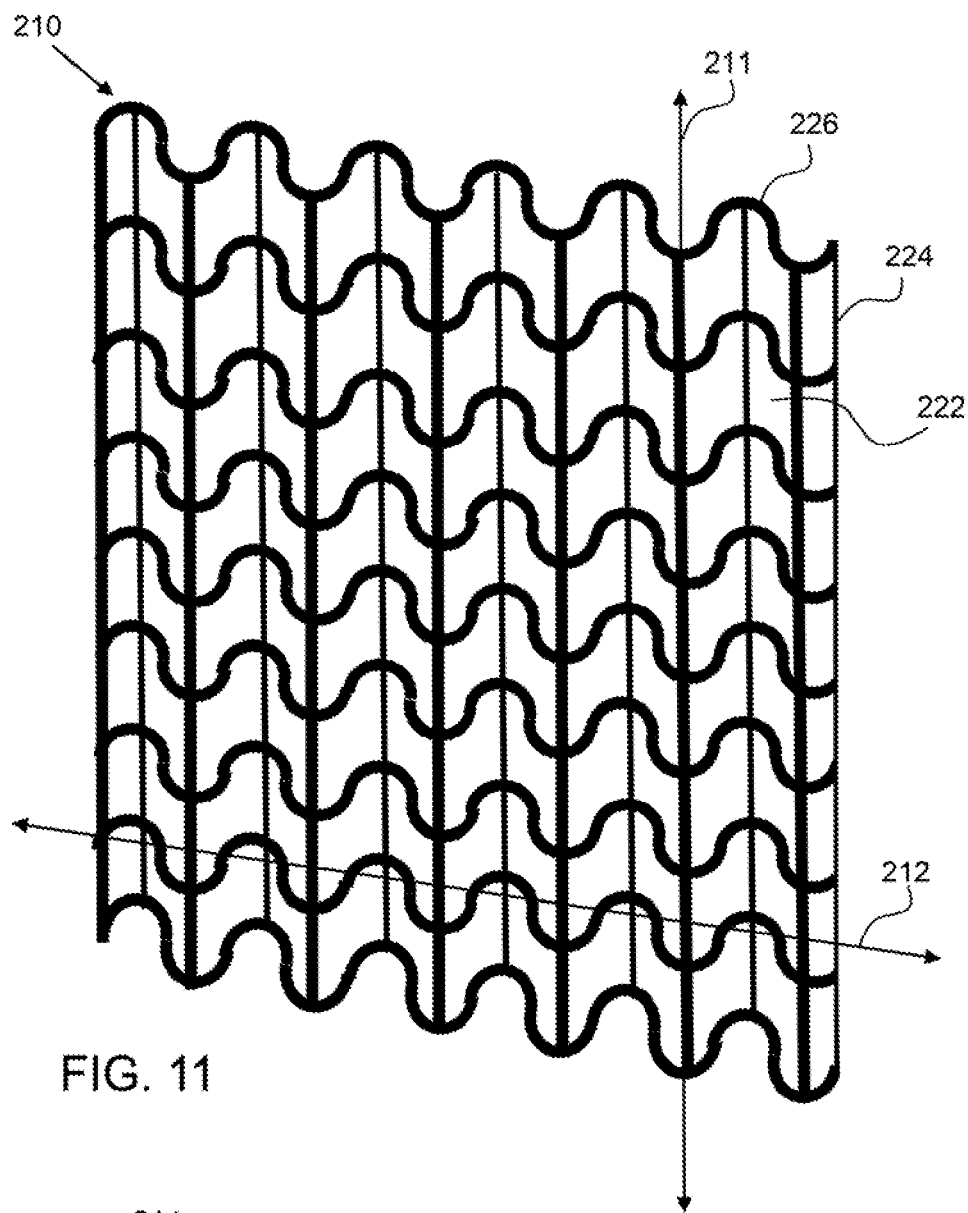
FIG. 11 shows a perspective view of an exemplary first corrugated portion.
Figure 12:
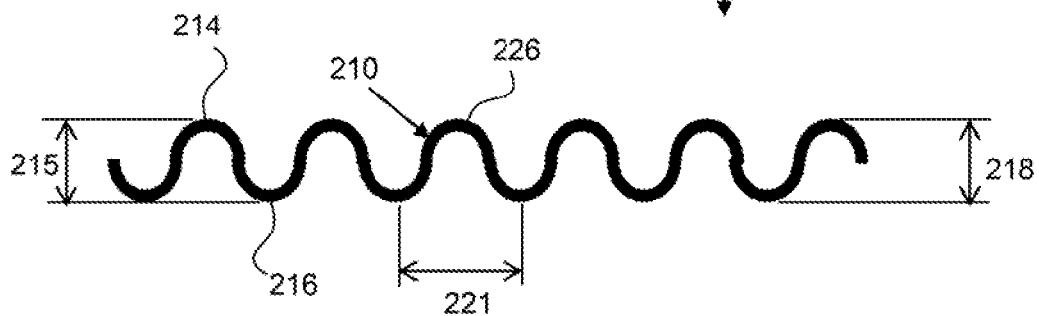
FIG. 12 shows a corrugation axis end view of the exemplary first corrugated portion shown in FIG. 11.

As shown in FIGS. 11 and 12, an exemplary first corrugated portion 210 comprises corrugated-axis extensions 224 that extend in the first corrugation axis 211 and cross-corrugation extensions 226 that extend in the first cross-corrugation axis 212, which is orthogonal to the first corrugation axis. In this embodiment, the corrugated-axis extensions and cross-corrugation extensions are strands, such as wire having a length that is much greater in dimension, such as at least 10 times greater, than a cross-sectional dimension of the strand. Apertures 222 are formed between the strands to allow flow of an ionic conductive medium, or electrolyte therethrough. As shown in FIG. 12, the first corrugated portion 210 has a first corrugation amplitude 218 or thickness 215 between a first side 214 and a second side 216. The corrugation pitch 221, or distance of a repeating unit of the corrugation is shown.

Figures 13, 14:
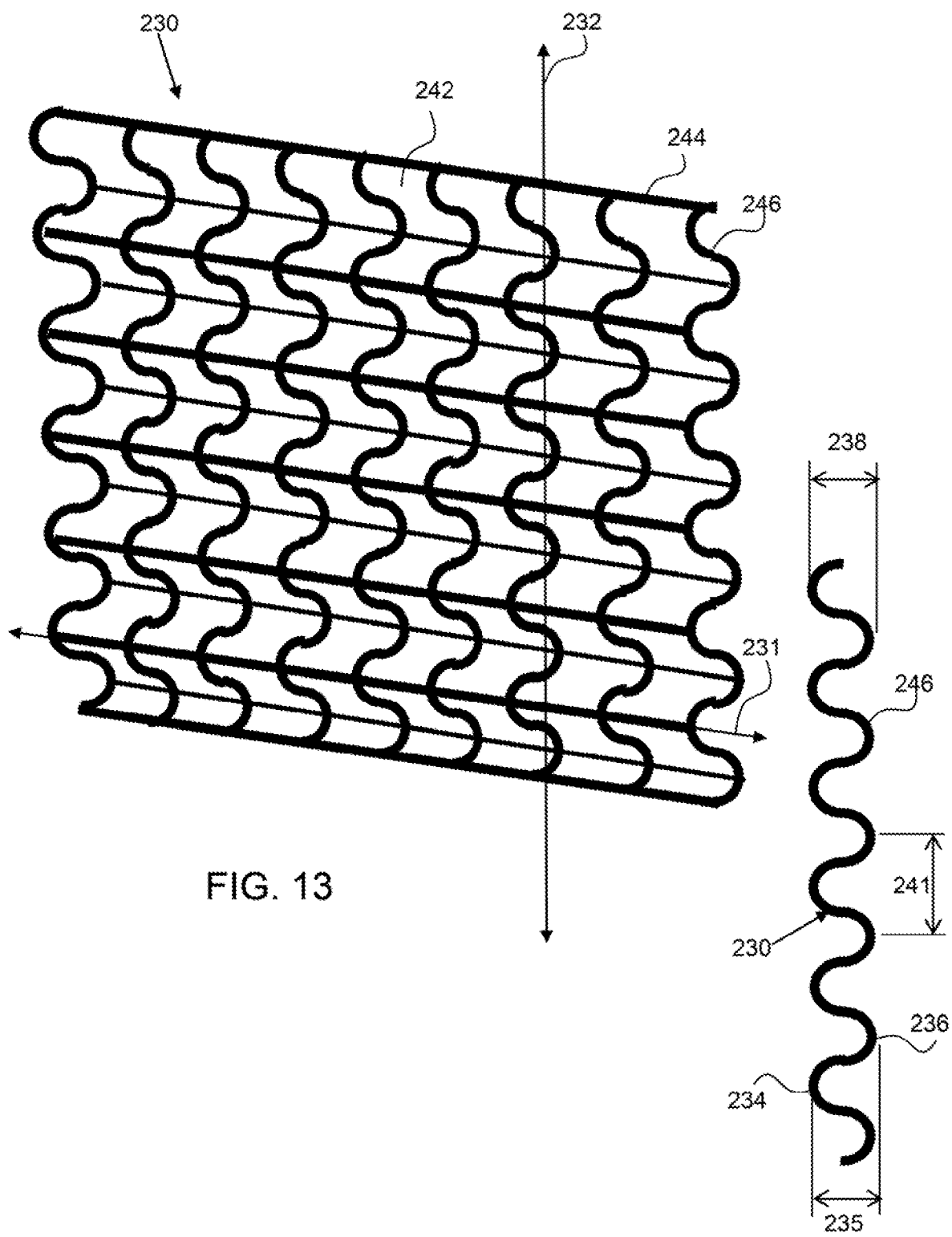
FIG. 13 shows a perspective view of an exemplary second corrugated portion.
FIG. 14 shows a corrugation axis end view of the exemplary first corrugated portion shown in FIG. 13.

As shown in FIGS. 13 and 14, an exemplary second corrugated portion 230 comprises corrugated-axis extensions 244 that extend in the second corrugation axis 231 and cross-corrugation extensions 246 that extend in the second cross-corrugation axis 232. In this embodiment, the corrugated-axis extensions and cross-corrugation extensions are strands, such as wire having a length that is much greater in dimension, such as at least 10 times greater, than a cross-sectional dimension of the strand. Apertures 242 are formed between the strands to allow flow of an ionic conductive medium, or electrolyte therethrough. As shown in FIG. 14, the second corrugated portion 230 has a second corrugation amplitude 238 or thickness 235 between a first side 234 and a second side 236. The corrugation pitch 241, or distance of a repeating unit of the corrugation is shown.

Figure 15:
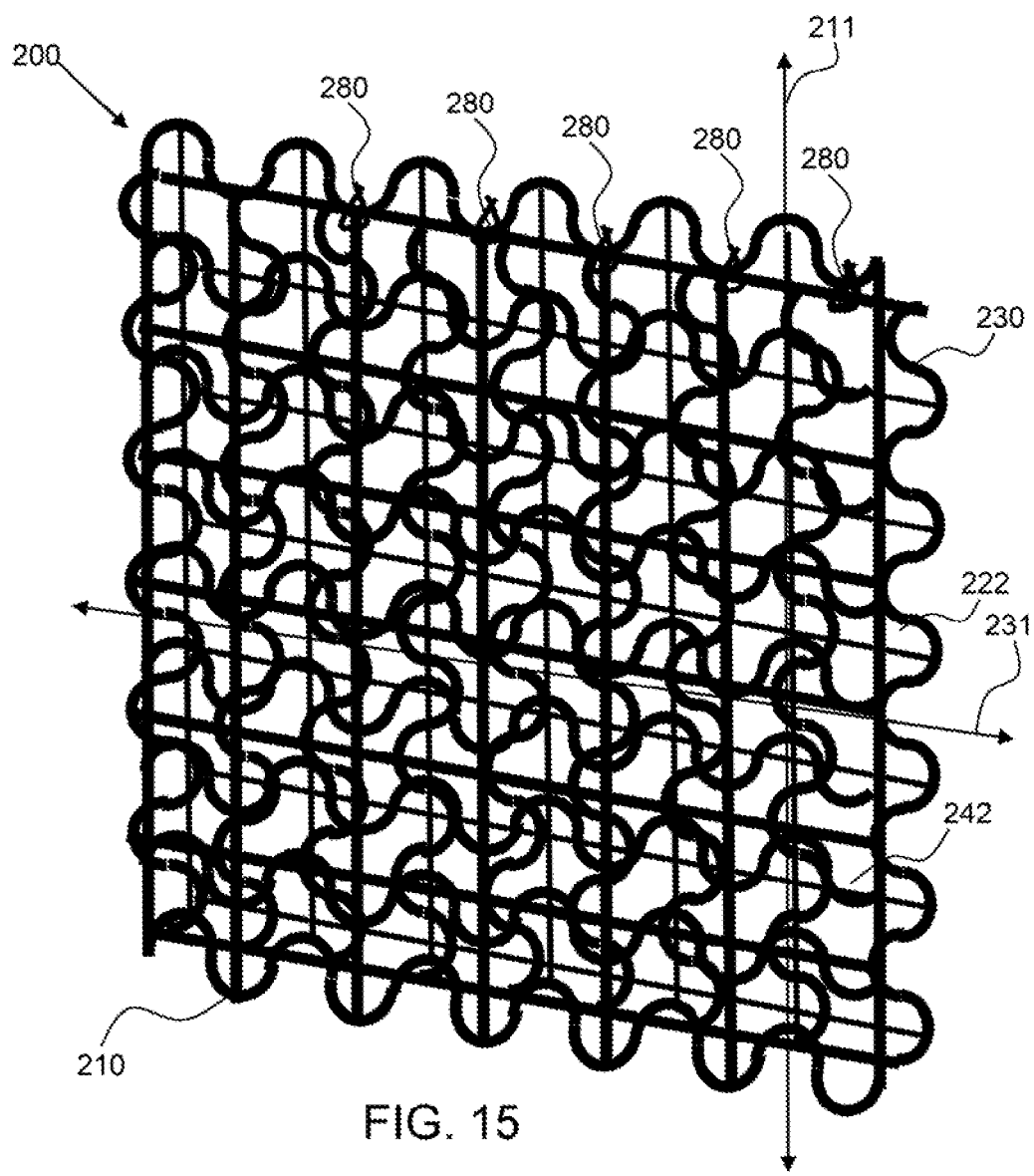
FIG. 15 show a perspective view of an exemplary fuel electrode having a first corrugated portion attached to a second corrugated portion by discrete attachments.
Figure 16:
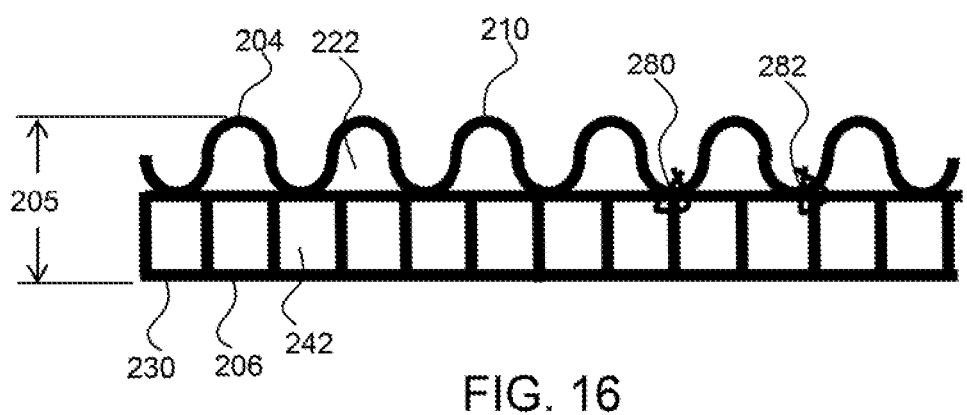
FIG. 16 shows a corrugation axis end view of the exemplary fuel electrode shown in FIG. 15.

As shown in FIGS. 15 and 16, an exemplary fuel electrode 200 has a corrugated structure including a first corrugated portion 210 attached to a second corrugated portion 230 by attachments 280. The first corrugated portion has a first corrugation axis 211 that is about 90 degrees offset from the second corrugation axis 231, wherein the first and second corrugated portion are configured essentially orthogonally to each other, with respect to their corrugation axes (although other angles may be used). Apertures or open spaces through the first and second corrugated portions 222, 242 respectively, enable electrolyte to flow freely through the fuel electrode to allow high reaction rates. As shown in FIG. 16, the fuel electrode 200 has a thickness 205 from a first outer side 204 and a second outer side 206. The first corrugated portion 210 is attached to the second corrugated portion 230 by attachments 280, such as discrete fasteners 282 that attach the two corrugated portions together in one discrete location.

In an exemplary embodiment, the corrugated portions of the fuel electrode made substantially of metal wire having a smooth continuous outer surface that is preferred for deposition of fuel thereon and the attachments of the fuel electrode may be made out of a material different than metal wire. A metal wire may be circular or oval in cross-sectional shape having a radius of curvature about the outer surface, for example. The metal wire may optimally have essentially no internal surface area, wherein the surface of the metal wire is essentially free of any porosity. The diameter of the strands, or maximum cross-sectional dimension, may be about 0.5 mm or more, about 1 mm or more, about 2 mm or more, about 3 mm or more about 5 mm or more, about 8 mm or more and any range between and including the diameters provided. It is desirable to have a small diameter as this will increase the surface area for fuel deposition, however the smaller the diameter the more flexible the wire mesh or screen may be. Thus, a combination of wire or strand diameters may be utilized in a corrugated portion or from one corrugated portion to another, as described herein.

Figure 17:
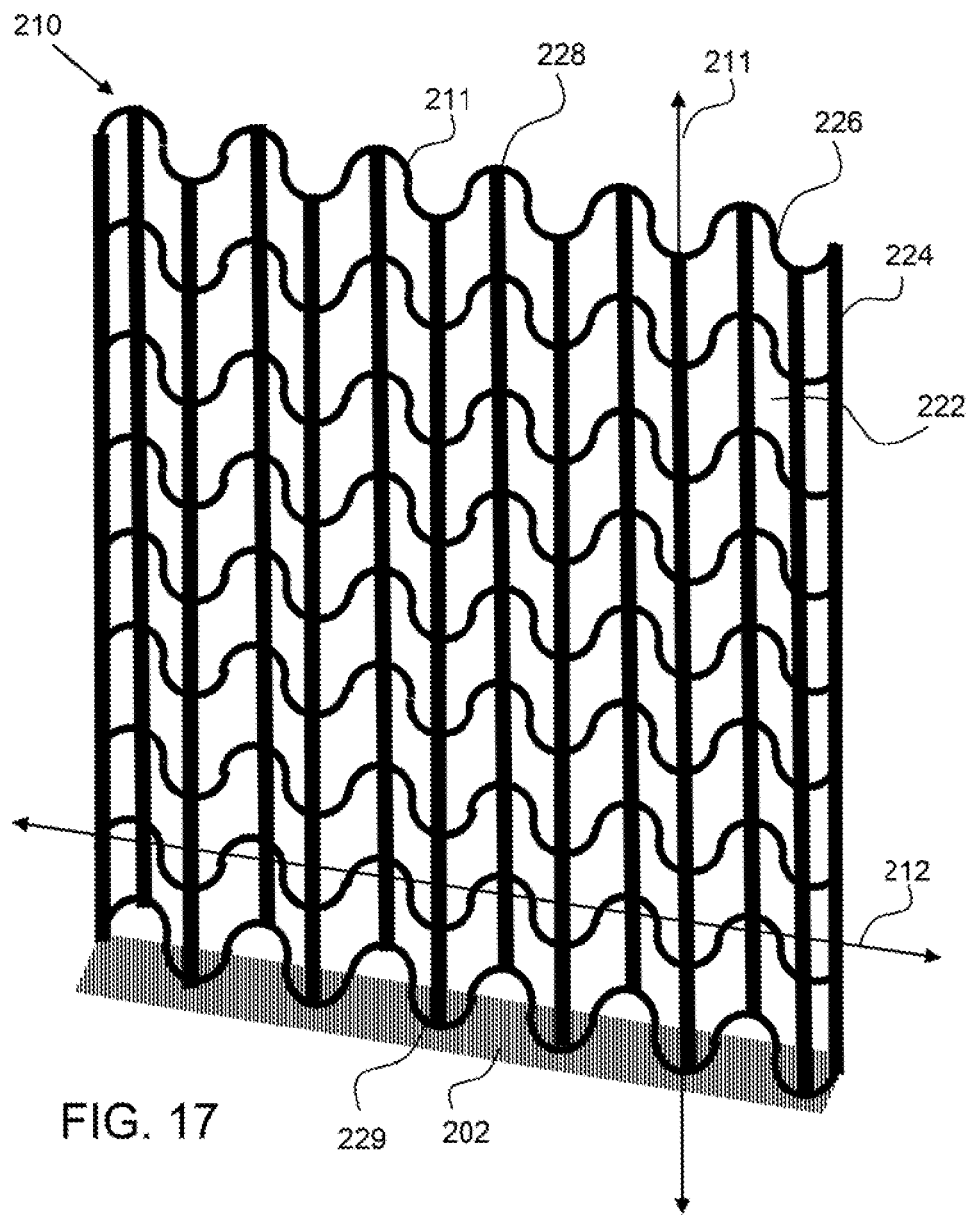
FIG. 17 shows a perspective view of an exemplary first corrugated portion having corrugation axis extensions that are larger in cross-sectional dimension than the cross-corrugation extensions.
Figure 18:
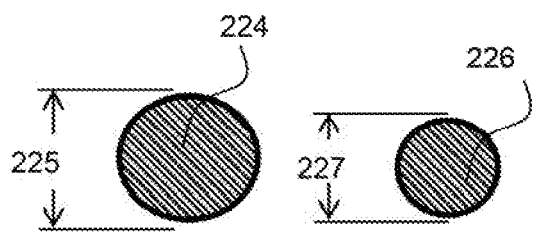
FIG. 18 shows cross-sectional views of the corrugation axis extension and the cross-corrugation extension.

As shown in FIG. 17, an exemplary first corrugated portion 210 has corrugation axis extensions 224 that are larger in cross-sectional dimension than the cross-corrugation extensions 226. FIG. 18 shows the cross-sections of the corrugation axis extensions 224 and the cross-corrugation extensions 226. The corrugation axis extensions have a greater cross-sectional dimension 225 than the cross-corrugation extensions cross-sectional dimension 227. The corrugation axis extensions may be larger in diameter to reduce resistance for electrical current collection, as these strands may be electrically coupled with a current collector 202 at the first end 228 or second end 229, as shown.

This ability to tailor the size and gap distance between corrugation axis extensions and cross-corrugation extensions enables optional tailoring of the corrugated portion to have optimized properties for the electrochemical cell system. In addition, not all of the corrugation axis extensions and cross-corrugation extensions have to be the same in cross-section dimension. A portion of the corrugation axis extensions may be one diameter, and the remaining may be smaller in diameter, for example.

In an embodiment, both of the first and second corrugated portions may have cross-corrugation extensions. An exemplary fuel electrode, in accordance with an embodiment, has first and second corrugated portions attached to each other, with the second corrugation axis being offset from the first corrugation axis and the cross-corrugation extensions of the first and/or second corrugated portions may extend to a current collector (e.g., 202). In one embodiment, in this fuel electrode, the second corrugation axis may be between about 45 to about 90 degrees (both inclusive) offset from said first corrugation axis. In an embodiment, in the fuel electrode, the corrugation-axis extensions of the first corrugated portion are larger in cross-sectional dimension than the cross-corrugation extension of the first corrugated portion. In an embodiment, the cross-corrugations extensions of the second corrugated portion are larger in cross-sectional dimension than the corrugation-axis extensions of the second corrugated portion.

Figure 19:
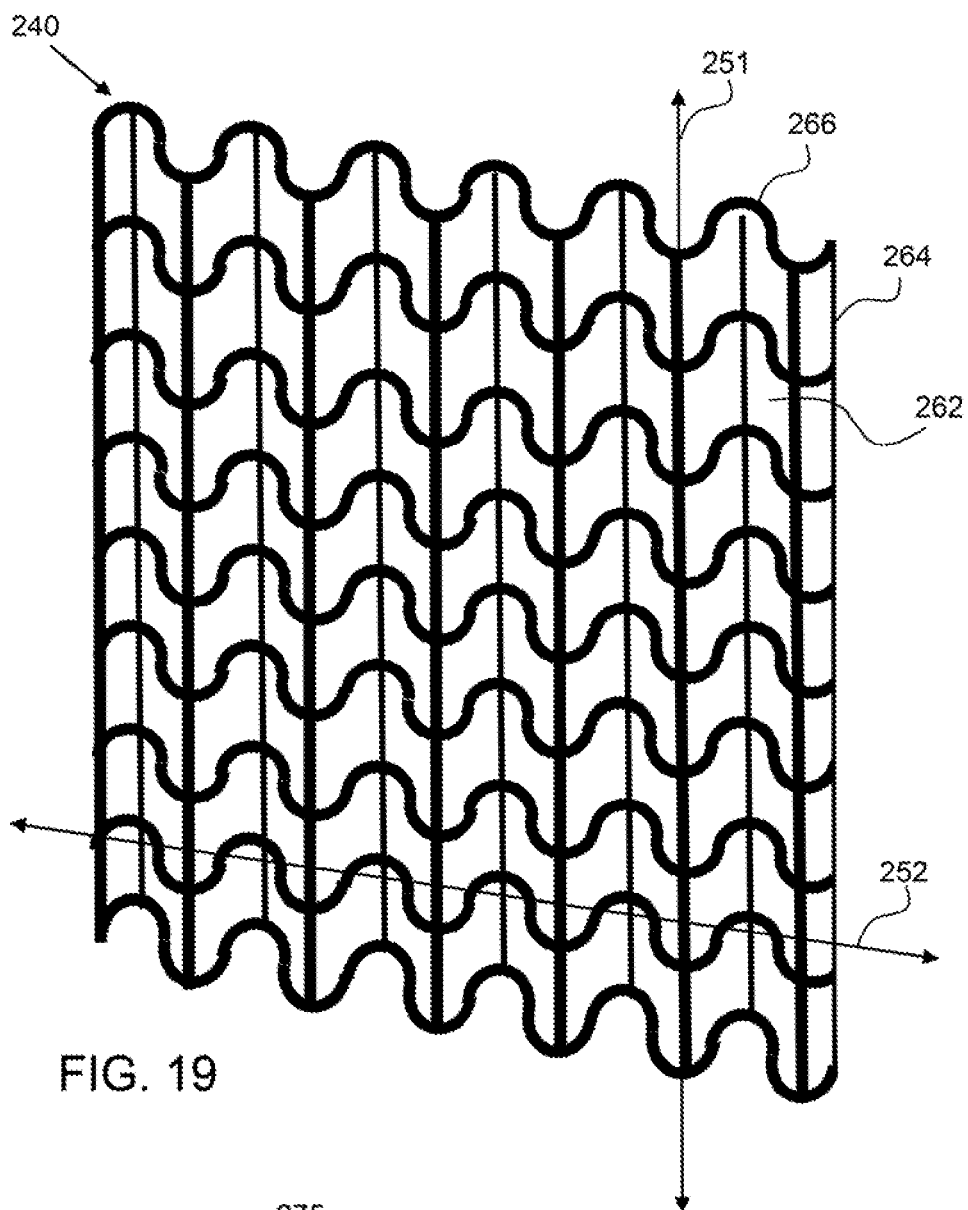
FIG. 19 shows a perspective view of an exemplary third corrugated portion.
Figure 20:
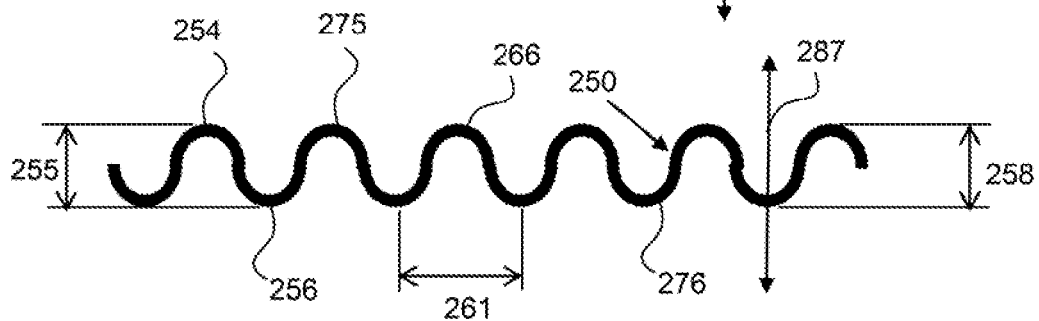
FIG. 20 shows a corrugation axis end view of the exemplary third corrugated portion shown in FIG. 19.

As shown in FIGS. 19 and 20, an exemplary third corrugated portion 250 comprises corrugated-axis extensions 264 that extend in the third corrugation axis 251 and cross-corrugation extensions 266 that extend in the third cross-corrugation axis 252. In this embodiment, the corrugated-axis extensions and cross-corrugation extensions are strands, such as wire having a length that is much greater in dimension, such as at least 10 times greater than a cross-sectional dimension of the strand. Apertures 262 are formed between the strands to allow flow of an ionic conductive medium, or electrolyte therethrough. As shown in FIG. 20, the third corrugated portion 250 has a third corrugation amplitude 258 or thickness 255 between a first side 254 and a second side 256. The corrugation pitch 261, or distance of a repeating unit of the corrugation is shown. The third corrugated portion has a corrugation peak 275 and corrugation trough 276, wherein the peak is the highest point and the trough is the lowest point of the corrugation, with respect to a vertical axis 287 (also referred to as a thickness direction or Z-axis) and the corrugated portion extending perpendicular to said vertical axis 287.

Figure 21:
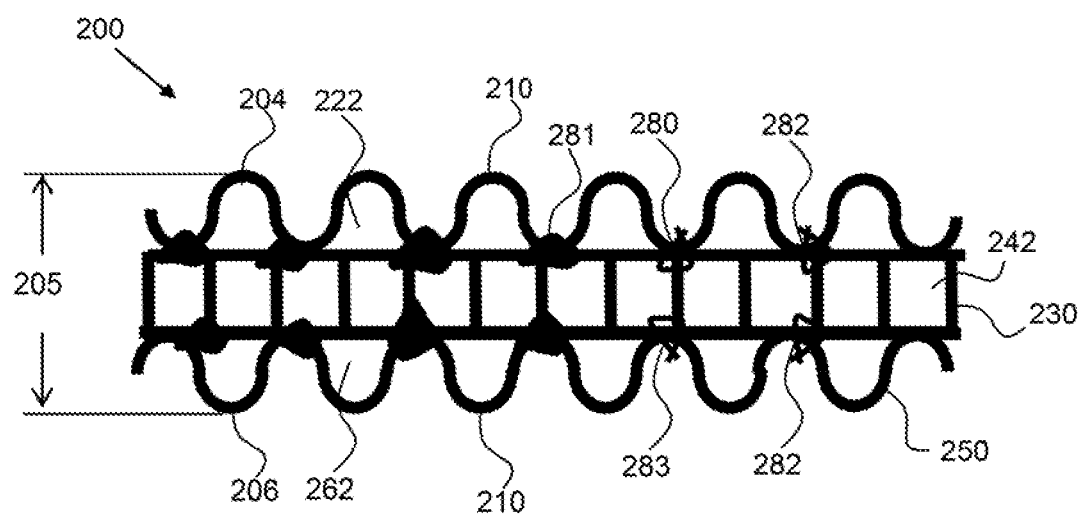
FIG. 21 shows an end view of an exemplary corrugated fuel electrode having first, second and third corrugated portions attached to each other and at offset angles.

As shown in FIG. 21, an exemplary fuel electrode 200 has a corrugated structure including first 210, second 230 and third 250 corrugated portions attached to each other. The first and third corrugated portions are aligned with the first and third corrugation axes aligned. The second corrugation portion is configured between the first and third corrugated portions and has a corrugation axis that is offset 90 degrees to the first and third corrugation axes. The first and third corrugation portions are attached to each other by attachments 280, both discrete fasteners 283 and adhesive 281. The adhesive is attached to the two adjacent corrugated portions and may extend around and encapsulate a strand of the corrugated portions.

Figure 22:
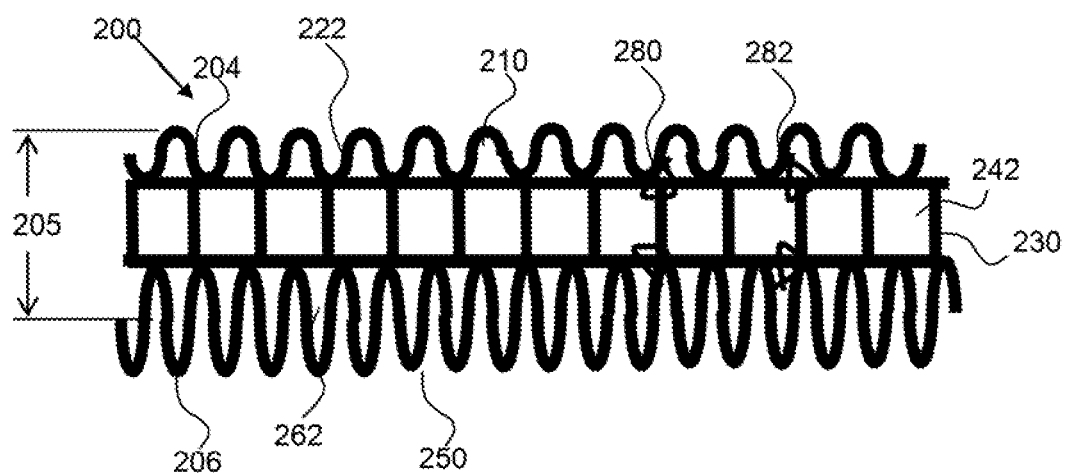
FIG. 22 shows an end view of an exemplary corrugated fuel electrode having first, second and third corrugated portions attached to each other and at offset angles and having different corrugation amplitudes and corrugation pitch.

As shown in FIG. 22, an exemplary fuel electrode 200 has a corrugated structure including first 210, second 230 and third 250 corrugated portions attached to each other. Like FIG. 21, the first and third corrugated portions 210, 250 are aligned with the first and third corrugation axes aligned. The second corrugation portion 230 is configured between the first and third corrugated portions 210, 250 and has a corrugation axis that is offset 90 degrees to the first and second corrugation axis. The first and third corrugation portions are attached to opposite sides of the second portion 230 by discrete attachments 282. The amplitude and corrugation pitch of the three corrugated portions, however, are each different from one another. This may be done to provide more surface area on one side versus the other, or to provide more stiffness in one direction than the other, for example. In any embodiment with multiple corrugated portions, each adjacent pair of corrugated parties may have their corrugation axes angularly offset from each other, while the axes of alternating corrugated parties may be offset or aligned.

In another embodiment, one of the second or third corrugated portions 230, 250 may be configured at a 45 degree offset angle to the first corrugated portion 210 and the other corrugated portion is configured with a 90 degree offset angle to the first corrugated portion 210. In still another embodiment, the fuel electrode may optimally comprise four corrugated portions with offset angles of 30 degrees, wherein when the first corrugated portion is configured vertically, one of the remaining corrugated portions is configured with about a 30 degree offset angle, one is configured with about a 60 degree offset angle and the last corrugated portion is configured with about a 90 degree offset angle. In this embodiment, the fuel electrode may be stiffened in multiple directions to prevent deflection and bowing.

A corrugated portion may have a corrugation, or pleat that is saw-tooth shaped having linear corrugation segments, whereby each corrugation forms a substantially triangular shape. A corrugation may be curved, or have one or more radius portions. In an exemplary embodiment, a corrugation has a wave shape resembling a sinusoid or modified sinusoidal wave shape. A corrugation may consist of a sinusoidal wave shape that is modified to approach a trapezoidal wave shape. A corrugation may have linear portions that extend along a peak and trough of the corrugation and connection segments that extend substantially vertically (i.e. in the Z-direction or thickness of the individual portion) between the peak and trough segments or at some offset angle with respect to vertical. A ratio of the amplitude to the pitch is the corrugation ratio, which defines how packed or spaced out the corrugations are. For example, a corrugation ratio of one means that the amplitude and pitch are equal, whereas a corrugation ratio of two means that the corrugation is twice as tall as it is wide. A higher corrugation ratio will create a higher sa/vol of the corrugated portion, whereby more material is within the volume defined by the product of the amplitude, the width and the length of the corrugated portion. A low corrugation ratio may be less desirable as it will not be as stiff. Stiffness of a corrugated portion in a direction orthogonal to the corrugation axis is increased by a higher corrugation ratio.

The corrugation ratio may also influence the ability of a corrugated portion to capture formations, dendritic material for example, that may slough or fall off the surface of a corrugated portion. A corrugated portion may have a corrugation ratio of about 0.25 or more, about 0.5 or more, about 0.75 or more, about 1.0 or more, about 1.5 or more, about 2.0 or more, about 3.0 or more, about 5 or more, about 10 or more and any ratio between and including the exemplary ratios provided. In accordance with an embodiment, a corrugated portion may have a corrugation ratio between about 0.25 and about 10.0 (both inclusive). In one embodiment, a corrugated portion may have a corrugation ratio between about 0.25 and about 5.0 (both inclusive). In one embodiment, a corrugated portion may have a corrugation ratio between about 0.25 and about 5.0 (both inclusive). In another embodiment, a corrugated portion may have a corrugation ratio of no more than about 3.0 (inclusive). The actual amplitude and pitch dimension may be selected based on the size of the electrochemical cell but in many cases will be on the order of about 0.1 cm or more, about 0.25 cm or more 0.5 cm or more, about 1 cm or more, about 2 cm or more, about 3 cm or more, about 5 cm or more and any range between and including the values provided. In an embodiment, the amplitude may be between about 0.1 cm and about 3.0 cm (both inclusive). In one embodiment, the amplitude may be between about 0.1 cm and about 1.5 cm (both inclusive). In an embodiment, the pitch may be between about may be between about 0.1 cm and about 3.0 cm (both inclusive). In one embodiment, the amplitude may be between about 0.1 cm and about 1.5 cm (both inclusive).

Figure 23:
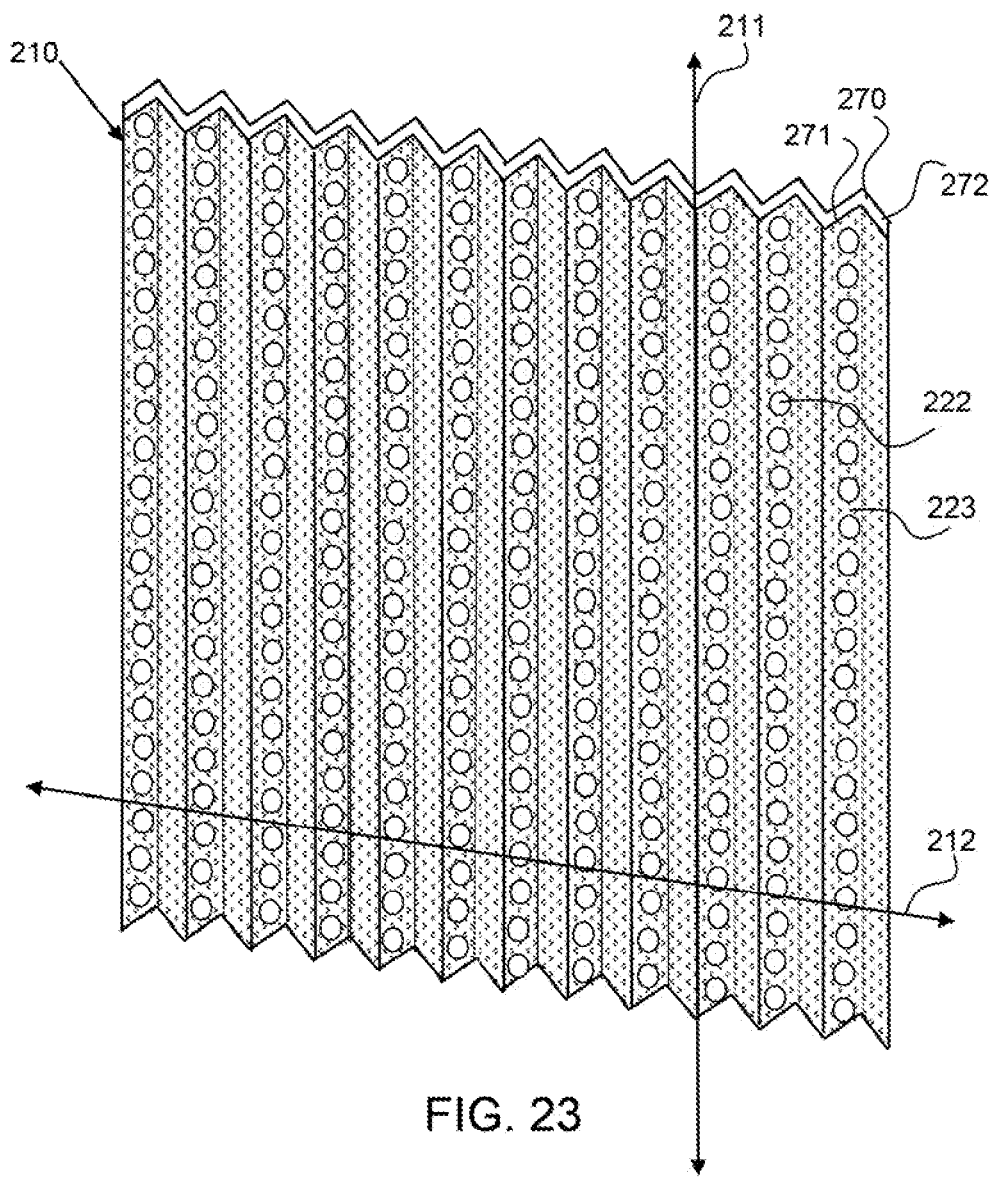
FIG. 23 shows a perspective view of an exemplary first corrugated portion having discrete apertures through the corrugated sheet material.
Figure 24:
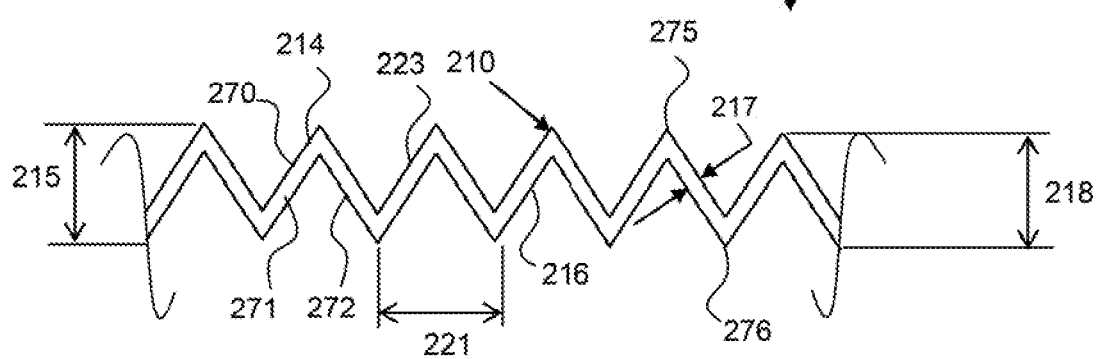
FIG. 24 shows an end view of an exemplary first corrugated portion having saw-tooth shaped corrugations or pleats.

As shown in FIGS. 23 and 24, an exemplary first corrugated portion 210 comprises a corrugated sheet of material 223 having apertures 222 through the sheet of material. The sheet of material may be a sheet of metal. The corrugations are saw-tooth shaped having linear segments 271, 272 that create triangular shaped corrugations 270 or pleat segments. The corrugations extend in the first corrugation axis 211 and the cross-corrugation axis 212 is orthogonal or perpendicular to the first corrugation axis. In a non-limiting embodiment, apertures 222 are formed through the corrugated sheet along a first corrugation segment 271 and not along the second corrugation segment 272, and allow flow of an ionic conductive medium, or electrolyte therethrough. The location, number or areal density, and shape of the apertures may be selected to provide suitable flow of electrolyte therethrough. In addition, the location of the apertures may be selected to produce a flow direction of electrolyte through the fuel electrode, wherein the flow may be up to prevent dislodging of slough or dendritic material. As shown in FIG. 24, the first corrugated portion 210 has saw-toothed shaped corrugations or pleats, having linear corrugation segments. The saw-toothed shaped corrugations have corrugation peaks 275 and corrugation troughs 276. The first corrugated portion 210 has a first corrugation amplitude 218 or thickness 215 between a first side 214 and a second side 216. The corrugation pitch 221, or distance of a repeating unit of the corrugation, as well as the sheet thickness 217 are shown.

The apertures 222 may be formed by punching, cutting, laser cutting, water cutting and the like. In an exemplary embodiment, a sheet is an expanded sheet of metal, wherein the metal sheet is perforated or cut and then stretched to form opening in the sheet material, usually diamond shaped openings. Expanded metal is an inexpensive method of forming a permeable metal sheet of material that can then be corrugated or pleated to form a corrugated portion.

Figure 25:
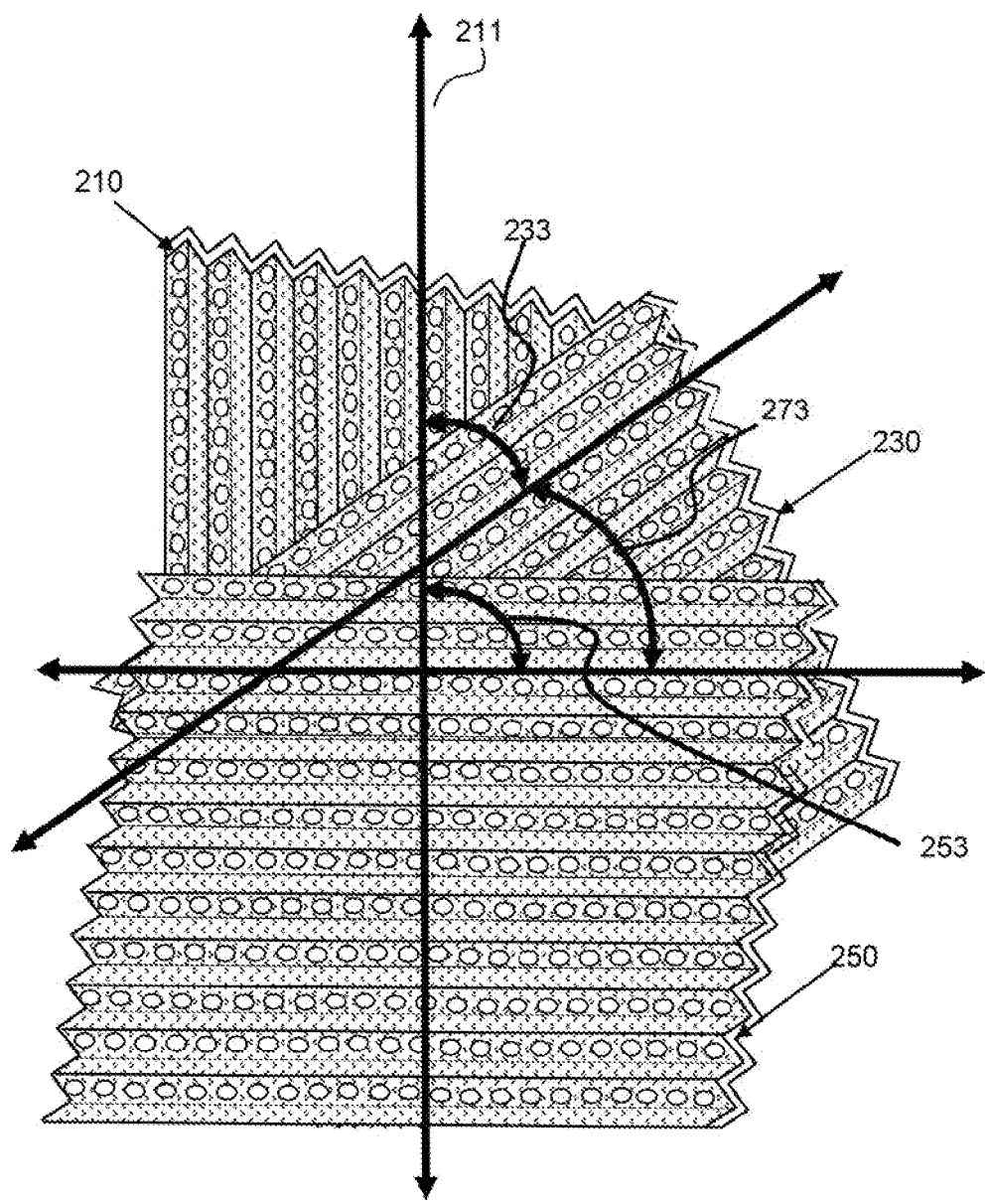
FIG. 25 shows exemplary first, second and third corrugated portions at offset corrugation axis angles.

FIG. 25 shows exemplary first 210, second 230 and third corrugated portions 250 each at offset corrugation axis angles relative to one another. The second corrugated portion 230 is at a second corrugation axis offset angle 233 from the first corrugated portion. The third corrugated portion 250 is at a first-to-third corrugation axis offset angle 253 from the first corrugated portion and at a second-to-third corrugation axis offset angle 273 from the second corrugated portion. In this embodiment, the second corrugated portion is at an offset angle of about 45 degrees from the both the first and third corrugated portions making the third corrugated portion orthogonal to the first corrugated portion. As described herein the offset angles may be selected for rigidity, flow, and/or electrical conductively purposes.

Figures 26, 27:
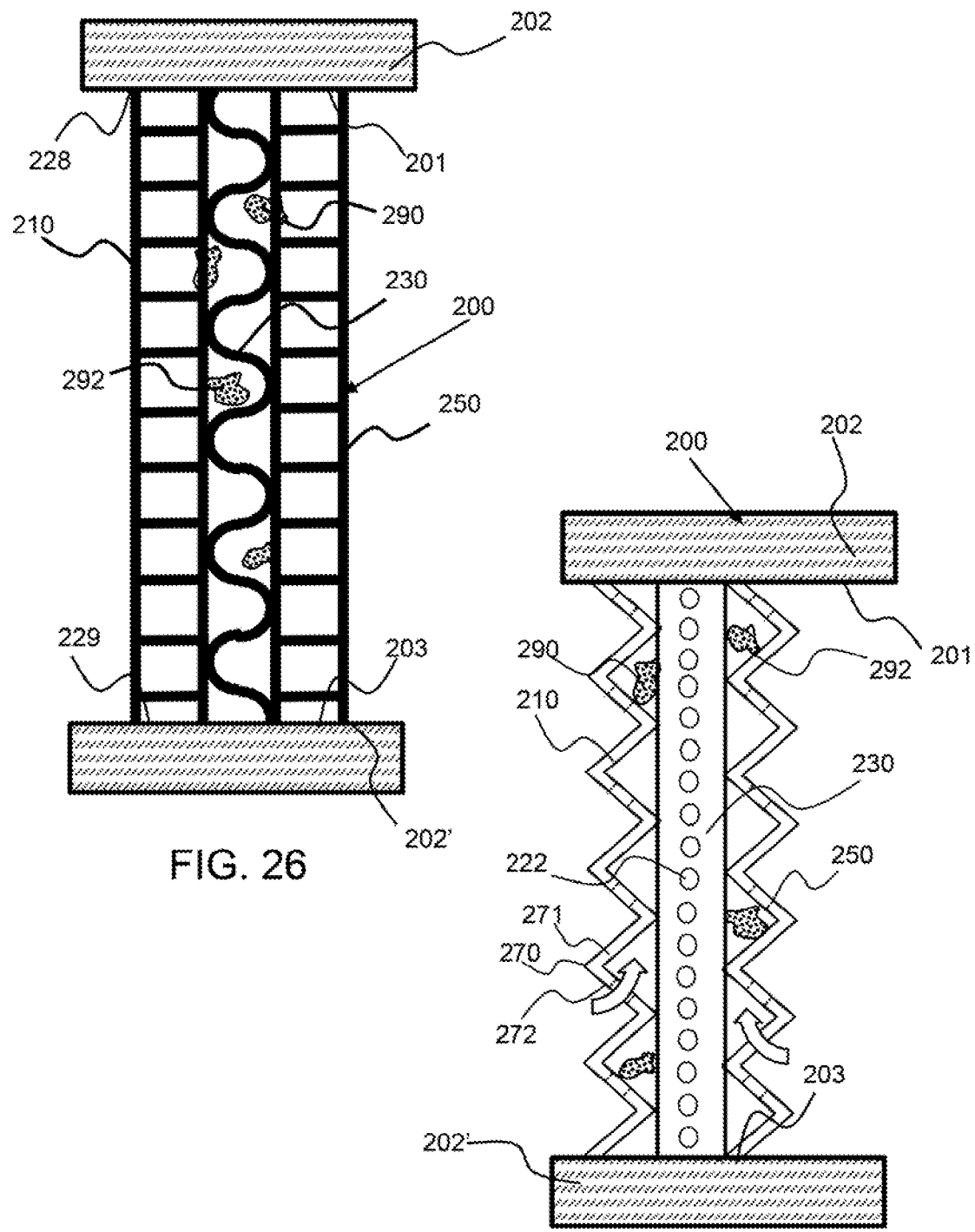
FIGS. 26 and 27 show a side view of an exemplary fuel electrode having first, second and third corrugated portions attached to each other and sloughed or dendritic material being captured in the corrugations between adjacent corrugated portions.

As shown in FIGS. 26 and 27, an exemplary fuel electrode has a corrugated structure having first 210, second 230 and third corrugated portions 250 attached to each other with sloughed 290 or dendritic material 292 being captured in the corrugations between adjacent corrugated portions. The fuel electrode has a corrugated electrode portions having strands in the middle as the second corrugated portion 230, and FIG. 26 shows corrugated portions formed out of a sheet of material having apertures on the outside as the first and third corrugated portions 210, 250. The apertures in the first 210 and third 250 corrugated portions, or the outer corrugated portions, may be configured in the second corrugation segment 272 to produce an upward flow through the fuel electrode, as indicated by the large arrows. Alternatively, the apertures may be formed only in the first corrugation segments 271, the upper segments, of the outer corrugated portions 210, 250 to prevent any sloughed 290 or dendritic material 292 from falling down and out through the apertures. With apertures only on the upper portion of the pleat segment, slough material may not be able to fall down through the corrugated portions to the bottom 203 of the fuel electrode. That option is beneficial because it keeps the slough metal in contact with the electrode for oxidation. The first end 228 and second end 229 of the fuel electrode 200 is electrically coupled with a current collector 202, 202' at the top 201 and bottom 203 of the fuel electrode, respectively.

Figure 28:
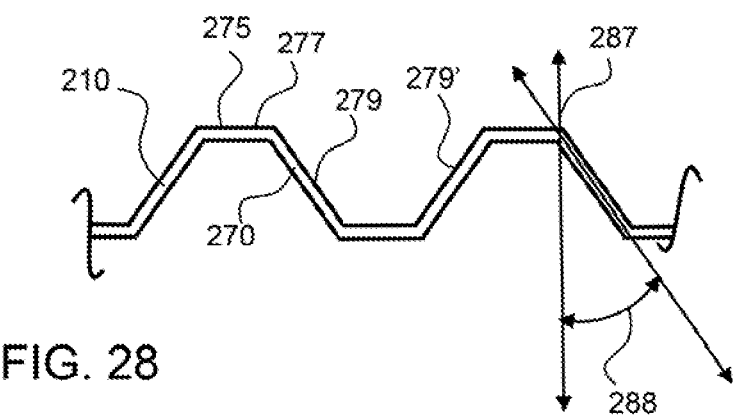
FIGS. 28 and 29 show end views of an exemplary corrugated portion having linear segments at the peak and troughs of the corrugations.
Figure 29:
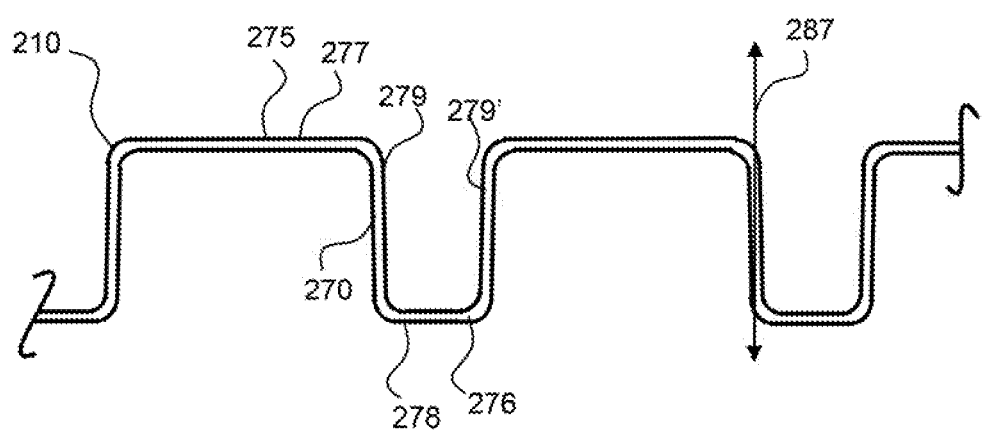

As shown in FIGS. 28 and 29, exemplary corrugated portion 210 has linear segments at the peak 275 and troughs 276 of the corrugations 270. A linear peak segment 277 and linear trough segment 278 extend essentially in the cross-corrugation axis direction and are coupled together by peak-trough connectors 279 that are at an offset angle 288 to the vertical axis as shown in FIG. 28, and that are substantially vertical as shown in FIG. 29. These types of corrugations may provide a high level of rigidity about the cross-corrugation axis.

Figure 30:
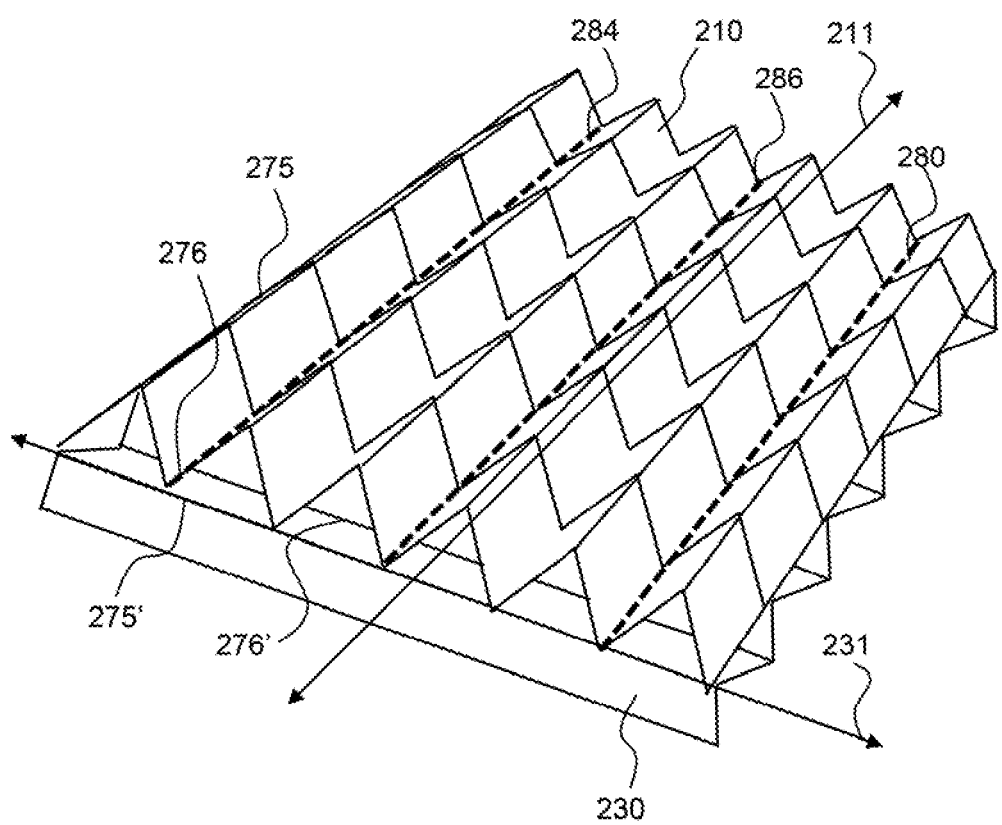
FIG. 30 shows a first and second corrugated portion attached by a stitch line attachment that extends along the trough of the first corrugated portion.

FIG. 30 shows a first corrugated portion 210 and second corrugated portion 230 attached by a stitch line attachment 286 that extends along the corrugation trough 276 of the first corrugated portion. The stitch line attachment is an example of a continuous attachment 284 (as opposed to discrete attachments at spaced apart points. The stitch line extends along the corrugation axis 211 of the first corrugated portion 210. The stitches may extend down and pull the peaks 275' of the second corrugated portion 230 to the troughs 276 of the first corrugate portion to firmly attach the two corrugated portions together.

The continuous stitched seam may optimally comprise at least 10 stitches made by the continuous thread that joins a first and second corrugated portion together. A thread may be a synthetic material, such as a polymeric material that is substantially non-reactive in the electrolyte, such as a fluoropolymer, polypropylene and the like. A thread may be a conductive material, such as a metal wire that both physically and electrically couples a first and second corrugated portion together. A thread may be stitched in a discrete or continuous manner to connect a first and a second corrugated portion together. A thread may be a supple material that is not free standing, whereby the thread will not hold a shape when a small compressive or flexural load is applied, such a gravity. For example, a thread may flex and deform when not supported by a surface.

Figure 31:
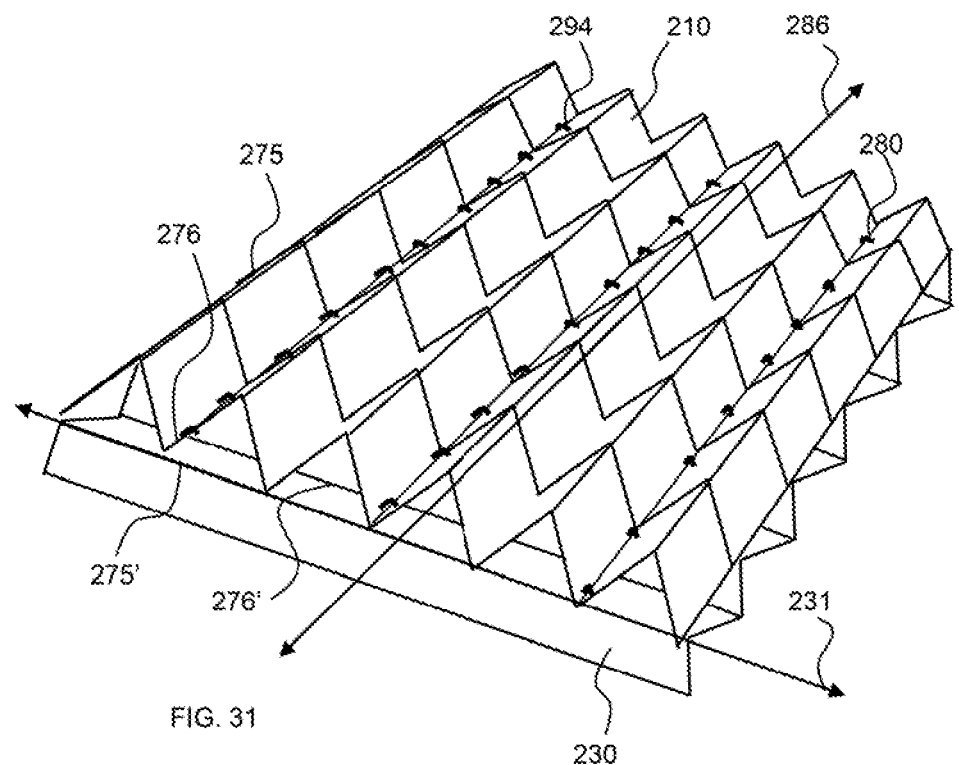
FIG. 31 shows a first and second corrugated portion attached by staples along the trough of the first corrugated portion.

FIG. 31 shows a first corrugated portion 210 and second corrugated portion 230 attached by staples 294 as discrete attachments along the corrugation trough 276 of the first corrugated portion. The staples may extend from a trough of the first corrugated portion and into the peaks, or proximal to the peaks of the second corrugated portion, wherein the peak of the second corrugate portion is adjacent the trough of the first corrugated portion. Any number or staples may be used to attach the first corrugation portion to the second corrugated portion and the staples may electrically couple the first and second corrugated portions together.

A staple may be metal or an electrically conductive material that physically and optionally electrically couples the first and second corrugated portions together. Staples may be attached along a trough of a first corrugated portion to the second corrugated portion, for example. A staple may be free standing, wherein the staple maintains a shape under small loads, such as gravity.

Figure 32:
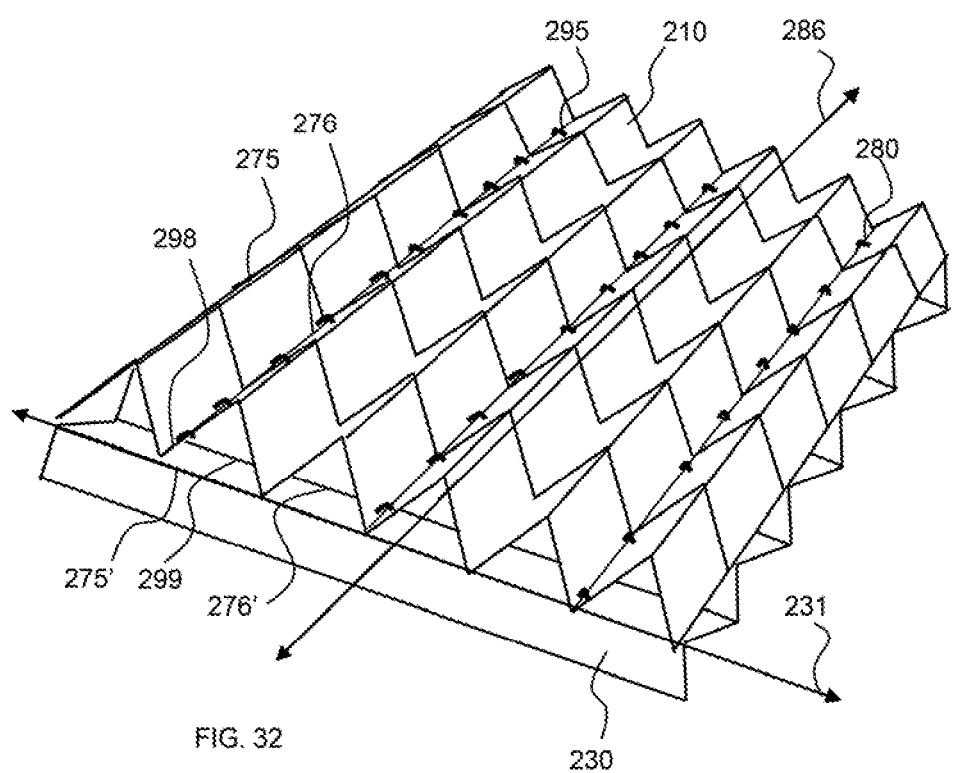
FIG. 32 shows a first and second corrugated portion attached by weld attachments along the trough of the first corrugated portion.

FIG. 32 shows a first corrugated portion 210 and second corrugated portion 230 attached by discrete weld attachments 295 configured along the corrugation trough 276 of the first corrugated portion. The weld attachments may be spot welds that attach the first and second corrugated portions together in discrete locations, or spots. A wire 298 of the first corrugated portion 210 may be welded with a wire 299 of the second corrugated portion 230. Any number or weld attachments 295 may be used to attach the first corrugation portion to the second corrugated portion and the weld attachments may electrically couple the first and second corrugated portions together.

An electrically conductive attachment, such as welding a thread in a stitch or stich line, or a staple, may provide electrical connections between the two corrugated portions and therefore reduce electrical resistance which may promote uniform fuel deposition.

Any of the embodiments disclosed herein may include corrugated portions that are calendared or crushed. In an embodiment, two or more corrugated portions may be calendared or crushed together to reduce thickness of the corrugated structure and thus the fuel electrode For example, after positioning the corrugated portions at an angle relative to one another, pressure may be applied to the structure (e.g., via a mechanical press or other pressure application device) to crush, e.g., corrugation-axis extensions and/or cross corrugation extensions of, the corrugated portions. In one embodiment, at least a portion of some of the extensions in the corrugated portions are non-linear and/or changed or transformed from their original structural configuration after calendaring or crushing. In an embodiment, the thickness of the corrugated structure is reduced approximately 5% to approximately 50% from its original thickness (i.e., a thickness before pressure is applied to the corrugated portions). In one embodiment, the thickness of the corrugated structure is reduced approximately 10% to approximately 20% from its original thickness (i.e., a thickness before pressure is applied to the corrugated portions).

Crushing or calendaring the corrugated portions provides a number benefits, including decreasing a thickness of the corrugated structure/fuel electrode, increasing a surface area per unit thickness, and a higher surface area to volume ratio. Crushed or calendared corrugated portions can also allow improved performance. For a given electrode surface area and a given inter-electrode gap (e.g. the distance between the air cathode and the near side of the anode/fuel electrode) reducing thickness can allow for shifting of the center of mass of the fuel electrode closer to the other electrode (i.e. the OEE (oxygen evolving electrode) or other charging electrode during charge or air cathode during discharge), while maintaining the same total fuel loading/capacity. This reduces total IR drop through the electrolyte, thereby reducing cell voltage during charge and increasing cell voltage during discharge. Alternatively, increasing surface area, for a given thickness and inter-electrode gap will decrease overpotential due to lower current density, leading to improved cell voltage. Cycling may also be improved while using a crushed/calendared corrugated structure. For example, if the center of mass of the fuel electrode is unchanged, the reduced thickness implies increased inter-electrode gap, which may aid in cyclability and reducing the tendency and probability of shorting, without adversely affecting performance (i.e. cell voltage). Increasing area/unit thickness can also lead to more uniform plating (charge) and oxidation (discharge) of the fuel electrode, since the difference in the electrode gap (i.e. as measured between the front and back sides of the fuel electrode) is reduced.

Also, if the total surface area of the corrugated structure is increased and crushed to the same thickness as the lower surface area, uncrushed anode/fuel electrode, the loading of the fuel on the anode (i.e. total mass or cell capacity) can be increased and improved. This results in increased energy density when concentration of the fuel species in the electrolyte is also increased. Further, increasing the electrode area while maintaining the same loading may result in reduced charge and discharge current densities. This tends to increase both performance and cyclability, while still maintaining large enough inter-electrode gaps critical for good cycling. The higher surface area for a given capacity also reduces average film thickness, film thickness non-uniformity and associated film stresses, which is important for achieving good cycling.

In addition to a corrugated structure being able to reduce shortage, a crushed/calendared corrugated structure may further reduce a cell's susceptibility to shortage by reducing an amount and size of dendrites that may be dislodged from the surface of the fuel electrode, and into the ionically conductive medium and housing.

Moreover, as generally noted throughout this disclosure, the herein described corrugated structure(s) (i.e., two or more corrugation portions assembled at an offset angle relative to one other, e.g., first and second corrugated portions) not only provide rigid structures with high surface area to volume ratios that may be used as fuel electrodes, but also allow for tailoring of the fuel electrode design. For example, the diameters (of wires or elements), weave density (e.g., wires per inch), the corrugation amplitude and/or pitch, the orientation and/or number of corrugated screens/portions bonded/attached together may be altered to change and tailor any number of features, including: surface area to volume ratio, structure conductivity, open area fraction, the corrugated structure stiffness or strength (resistance to bending), open void fraction, structure thickness, and total project structure surface area. Using smooth portions or wires also leads to smoother fuel deposition and better cell cycling.

Figure 33:
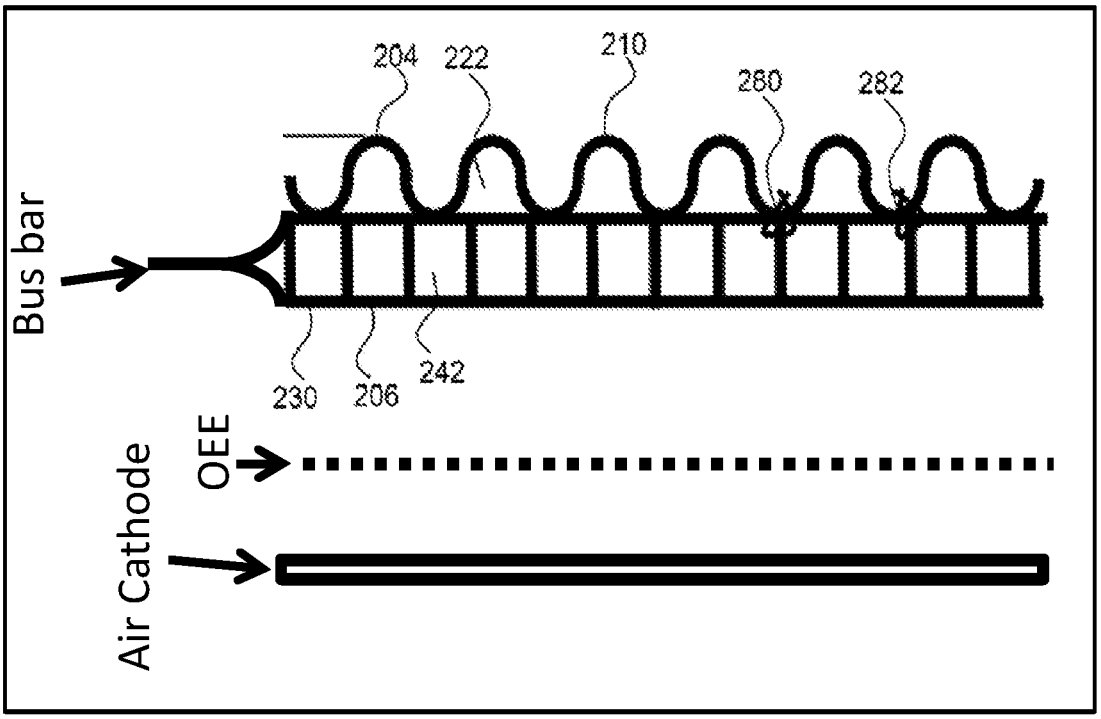
FIG. 33 shows a schematic end view of an exemplary corrugated structure used as a fuel electrode and arranged with a cathode in an electrochemical cell in accordance with an embodiment.

Any of the herein described embodiments of a corrugated structure may be used as a fuel electrode/anode in an electrochemical cell having a cathode and an ionically conductive medium communicating the fuel electrode. FIG. 33 shows an example arrangement of a corrugated structure (e.g. as shown in FIG. 16) provided as the fuel electrode/anode relative to a cathode (e.g., air electrode) and any other electrodes (e.g., OEE) (all of which are provided in a cell housing along with an ionically conductive medium) in an electrochemical cell, in accordance with an embodiment. The current collector (e.g. 202) or busbar is attached to the proximal corrugated portion (or screen), i.e., the portion of the corrugated structure that is closest to the cathode.

Figure 34:
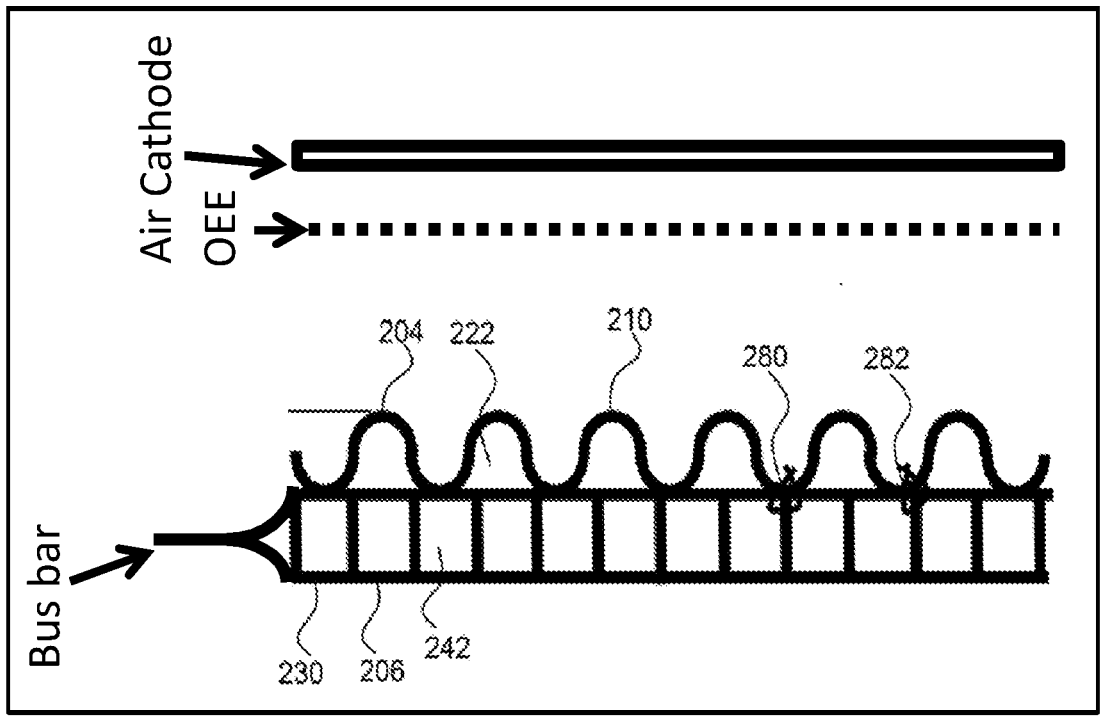
FIG. 34 shows a schematic end view of an exemplary corrugated structure used as a fuel electrode and arranged with a cathode in an electrochemical cell in accordance with another embodiment.

Furthermore, since each of the embodiments of the disclosed corrugated structure is a composite structure, assembled from individual corrugated screens that are coupled together via spot welds, staples, stitches, etc., electrical conductance through and across the corrugated structure can be varied by: (i) coupling individual screens that have different electrical resistance (i.e., different pitch and/or diameter), (ii) how the structure is bussed ((e.g. bussing all screens together, bussing only the screen proximal to the OEE or cathode, bussing only the screen distal from OEE or cathode), and/or (iii) changing the type and/or density of the attachment points between individual screens, for example. This may further allow control over the distribution of fuel over the anode/fuel electrode, which may be advantageous for improved cyclability. For example, as shown in FIG. 34, a corrugated structure may be provided or assembled as a fuel electrode/anode in an inverted configuration as compared to the one shown in FIG. 33; i.e., the corrugated structure may be arranged with a cathode and any other electrodes (e.g., OEE) in a cell such that the current collector (e.g., 202) or busbar is attached only to the distal corrugated portion (or screen), i.e., the portion of the corrugated structure that is farthest away from the cathode, or, in other words, the corrugated portion that is on an opposite or outer side of the structure relative to the side at which the cathode is nearest. Assembling the anode/fuel cell in this manner may improve cycling within the cell.

When used herein, the terms "peak and "trough" are used for convenience in reference to the Figures are not intended to imply that there is necessarily any structural difference between the two or any particular orientation, and thus there is no requirement of a "peak" vertically higher than any "trough". Hence, these terms should be interpreted to denote a specific orientation for the fuel electrode. They could also be referred to as peaks on the first and second side because a trough is essentially a peak on the opposite sides. Whatever terminology is used is simply for convenience in reference to the Figures. In many embodiments the fuel electrode will be in a vertical orientation.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

The open area percentage of a corrugated portion, the percent of the area that is open or represented by apertures, may optimally be engineered with respect to the amount of flow that will be required through the corrugated portion as well as the other factors of the corrugated portion including the corrugation ratio, amplitude and pitch dimensions. An exemplary corrugated portion or corrugated fuel electrode may have an open area percentage of about 50% or more, 75% or more, about 85% or more, about 90% or more, about 95% or more and any range between and including the open area percentages provided. In accordance with an embodiment, the corrugated portion(s) and/or corrugated fuel electrode may have an open area percentage between about 50% to about 95% (both inclusive). A corrugated electrode may have open area that extends completely through the electrode, from a first side to a second side, whereby a straight line can be drawn from a first side to second side through said open area. A corrugated portion or the fuel electrode may be effectively permeable to allow electrolyte to flow therethrough. In an embodiment, each of the corrugated portions used to form the fuel electrode may have a larger open area percentage while, after their assembly (and offset), the fuel electrode has a smaller open area percentage than the individual corrugated portions. For example, in one embodiment, each of the corrugated portions may have an open area percentage of about 50% to 95%; the fuel electrode formed using said corrugation portions may have an open area percentage of about 5% to about 80%, in accordance with an embodiment. In one embodiment, the corrugation portion and/or fuel electrode may have a permeability through the plane of the material that is between about 100 Frazier and about 500 Frazier, including the Frazier values provided.

A fuel electrode made from two or more corrugated portions that are attached to each other may have a volumetric void fraction, the percentage of the volume defined by the fuel electrode that is open space, that is high to enable good transport and flow of electrolyte therethrough. The volume of the fuel electrode is defined by the product of the outside dimension thickness, length and width of the fuel electrode. An exemplary corrugated portion may have a volumetric void fraction of about 75% or more, about, about 85% or more, about 90% or more, about 95% or more and any range between and including the percentages provided. In an embodiment, the fuel electrode has a volumetric void fraction between about 80% and 99.5% (both inclusive). In another embodiment, the fuel electrode has a volumetric void fraction between about 90% and about 99.5% (both inclusive). In yet another embodiment, the fuel electrode has a volumetric void fraction between about 95% and about 99.5% (both inclusive).

It is desirable to maximize reaction surface area per volume, sa/vol, of the corrugated portions and/or fuel electrode and enable effective exchange of the ionic fluid or electrolyte. An exemplary corrugated portion or corrugated fuel electrode may optimally have a surface area to volume ratio, sa/vol, of about 0.5 of more, about 1 or more, about 5 or more, about 10 or more and any range between and including the sa/vol values provided. In an embodiment, the corrugation portion(s) and/or the fuel electrode has a sa/vol between about 0.25 and about 30 (both inclusive). In another embodiment, the corrugation portion(s) and/or the fuel electrode has a sa/vol between about 1.0 and about 10 (both inclusive). In yet another embodiment, the corrugation portion(s) and/or the fuel electrode has a sa/vol between about 2.0 and about 6.0 (both inclusive). In one embodiment, the corrugation portion(s) and/or the fuel electrode has a sa/vol of about 1.0. In one embodiment, the corrugation portion(s) and/or the fuel electrode has a sa/vol of about 3.0. This value (sa/vol) can be calculated approximately by taking into account the diameter of the wire and the number of wires per unit length in both length and width direction as well as the volume occupied by the corrugated electrode, such as the amplitude of the corrugated portions that are attached multiplied by the area, length and width, occupied by the electrode. For example, a woven screen with a size of 24 by 27 by 0.6 cm utilizing round cross-sectional wires has a surface area of about 1,400 cm2 and a volume of about 389 cm3. This example has a sa/vol of about 3.6 cm2/cm3. The density of an exemplary corrugated electrode having first and second corrugated portions made out of woven screen having circular cross section wires with a diameter of about 3 mm and substantially square openings having a distance of 5 mm is about 0.065 g/cc, or 0.8% the density of solid nickel.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A rechargeable electrochemical cell comprising:
a metal fuel electrode comprising:
   a) a first corrugated portion formed of electrically conductive material, the first corrugated portion having a first corrugation axis and comprising a plurality of apertures therethrough;
   b) a second corrugated portion formed of electrically conductive material, the second corrugated portion having a second corrugation axis that is offset from said first corrugation axis and comprising a plurality of apertures extending therethrough; and
   c) electrode attachments attaching the first corrugated portion and the second corrugated portion to each other;
an air cathode for reducing oxygen during discharging;
an ionically conductive medium communicating the metal fuel electrode and the cathode; and
an oxidable metal fuel for electrodeposition on the corrugated portions of the metal fuel electrode during charging and for oxidation at the metal fuel electrode during discharging,
wherein the metal fuel electrode with the oxidable metal fuel thereon and the air cathode constitute a metal-air cell.

2. The rechargeable electrochemical cell of claim 1, wherein the offset of the second corrugation axis from the first corrugation axis is between about 25 degrees to about 90 degrees.

3. The rechargeable electrochemical cell of claim 1, wherein the second corrugation axis is about 45 degrees offset from said first corrugation axis.

4. The rechargeable electrochemical cell of claim 1, wherein the second corrugation axis is about 90 degrees offset from said first corrugation axis.

5. The rechargeable electrochemical cell of claim 1, wherein the corrugated portions comprise a surface area to volume ratio (sa/vol) between about 0.5 and about 10.0.

6. The rechargeable electrochemical cell of claim 1, wherein the corrugated portions comprise a surface area to volume ratio (sa/vol) between about 0.25 and about 30.0.

7. The rechargeable electrochemical cell of claim 6, wherein the corrugated portions comprise a surface area to volume ratio (sa/vol) of about 1.0 and about 10.0.

8. The rechargeable electrochemical cell of claim 1, wherein corrugated portions comprise an open surface area between about 50% to about 95%.

9. The rechargeable electrochemical cell of claim 1, wherein the metal fuel electrode has a volumetric void fraction between about 90% to about 99.5%.

10. The rechargeable electrochemical cell of claim 1, wherein at least one of the first corrugated portion and the second corrugated portions comprises a sheet having the apertures therethrough, wherein said sheet has a substantially uniform thickness.

11. The rechargeable electrochemical cell of claim 1, wherein at least one of the first corrugated portion and the second corrugated portion comprises a screen.

12. The rechargeable electrochemical cell of claim 11, wherein the screen is a woven screen.

13. The rechargeable electrochemical cell of claim 11, wherein the first corrugated portion and second corrugated portion comprise corrugation-axis extensions and cross-corrugation extensions.

14. The rechargeable electrochemical cell of claim 13, wherein the corrugation-axis extensions and cross-corrugation extensions are wires.

15. The rechargeable electrochemical cell of claim 13, wherein both the first and second corrugated portions are screens and the corrugation-axis extensions of the first corrugated portion extend and connect to a current collector.

16. The rechargeable electrochemical cell of claim 1, wherein the first corrugated portion has a first corrugation ratio and the second corrugated portion has a second corrugation ratio, wherein both the first and second corrugation ratios are greater than 0.75 and no more than about 5.0.

17. The rechargeable electrochemical cell of claim 1, wherein the electrode attachments are stitches.

18. The rechargeable electrochemical cell of claim 1, wherein the electrode attachments comprise a staple that extends from the first corrugated portion around a portion of the second corrugated portion.

19. The rechargeable electrochemical cell of claim 1, wherein the electrode attachments comprise a weld attachment that comprises the first corrugated portion fused to the second corrugated portion.

20. The rechargeable electrochemical cell of claim 1, further comprising:
   a) a third corrugated portion formed of an electrically conductive material, the third corrugated portion having a third corrugation axis that is offset from said second corrugation axis and having a plurality of apertures extending therethrough;
   wherein the third corrugated portion and said first and second corrugated portions are attached to each other by said electrode attachments.

21. The rechargeable electrochemical cell of claim 1, wherein the first corrugated portion and second corrugated portion are each a metal screen.

22. The rechargeable electrochemical cell of claim 14, wherein the wire has essentially no internal surface area.

23. The rechargeable electrochemical cell according to claim 1, wherein the first corrugated portion and the second corrugated portion are calendared or crushed together.

24. The rechargeable electrochemical cell according to claim 1, further comprising a charging electrode.

25. The rechargeable electrochemical cell according to claim 1, wherein the first corrugated portion and the second corrugated portion are calendared or crushed together.

26. A fuel electrode for a rechargeable electrochemical cell, comprising:
   a) a first corrugated portion formed of electrically conductive metal material, the first corrugated portion having a first corrugation axis and comprising a plurality of apertures therethrough;
   b) a second corrugated portion formed of electrically conductive metal material, the second corrugated portion having a second corrugation axis that is offset from said first corrugation axis and comprising a plurality of apertures extending therethrough; and
   c) electrode attachments attaching the first corrugated portion and the second corrugated portion to each other;
   wherein an oxidable metal fuel is electrodeposited on the fuel electrode for oxidation at the fuel electrode during discharging,
   wherein the electrically conductive metal material of each corrugated portion has a smooth continuous outer surface with essentially no internal surface area and receives the electrodeposited metal fuel thereon during charging.

27. The fuel electrode of claim 26, wherein at least one of the first corrugated portion and the second corrugated portion is a screen.

28. The fuel electrode of claim 27, wherein the screen is a woven screen.

29. The fuel electrode of claim 27, wherein the screen is formed of corrugation-axis extensions and cross-corrugation extensions.

30. The fuel electrode of claim 29, wherein the corrugation-axis extensions and cross-corrugation extensions are wires of the electrically conductive metal material having essentially no internal surface area.

31. A rechargeable electrochemical cell comprising:
the fuel electrode according to claim 26;
an air cathode for reducing oxygen during discharging;
an ionically conductive medium communicating the fuel electrode and the cathode; and
an oxidable metal fuel for electrodeposition on the corrugated portions of the fuel electrode during charging and oxidation at the fuel electrode during discharging,
wherein the fuel electrode with the oxidable metal fuel thereon and the air cathode constitute a metal-air cell.

32. The rechargeable electrochemical cell according to claim 31, further comprising a charging electrode.

33. The rechargeable electrochemical cell according to claim 1, wherein the oxidable metal fuel is configured to be electrodeposited on the corrugated portions of the fuel electrode.

* * * * *